(12) United States Patent
Ding et al.

(10) Patent No.: US 8,958,512 B1
(45) Date of Patent: Feb. 17, 2015

(54) SYSTEM AND METHOD FOR RECEIVER EQUALIZATION ADAPTATION

(71) Applicant: Altera Corporation, San Jose, CA (US)

(72) Inventors: Weiqi Ding, Fremont, CA (US); Wei Li, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/057,955

(22) Filed: Oct. 18, 2013

(51) Int. Cl.
*H04B 1/10* (2006.01)
*H04L 25/03* (2006.01)

(52) U.S. Cl.
CPC ................................. *H04L 25/03057* (2013.01)
USPC ............ 375/350; 375/229; 375/232; 375/233; 375/317; 375/345

(58) Field of Classification Search
CPC ....................... H04L 25/03057; H04L 27/3809
USPC ................... 375/229, 232, 233, 317, 350, 345
See application file for complete search history.

(56) References Cited

U.S. PATENT DOCUMENTS

| | | | |
|---|---|---|---|
| 5,467,370 A | 11/1995 | Yamasaki et al. | |
| 5,796,778 A | 8/1998 | Kurker | |
| 6,229,397 B1 | 5/2001 | Miura | |
| 6,556,635 B1 | 4/2003 | Dehghan | |
| 7,277,510 B1 | 10/2007 | Kilani et al. | |
| 8,081,720 B1 | 12/2011 | Sutardja | |
| 8,098,588 B1 | 1/2012 | Berndt et al. | |
| 8,391,350 B2 | 3/2013 | Chan et al. | |
| 8,401,064 B1 | 3/2013 | Lin et al. | |
| 2004/0264705 A1 | 12/2004 | Hiipakka | |
| 2007/0110148 A1* | 5/2007 | Momtaz et al. | ............... 375/232 |
| 2009/0316770 A1 | 12/2009 | Hidaka | |
| 2009/0316771 A1 | 12/2009 | Hidaka | |
| 2012/0170638 A1 | 7/2012 | Chen | |
| 2012/0207202 A1 | 8/2012 | Hidaka | |
| 2013/0142244 A1 | 6/2013 | Tan | |
| 2013/0142245 A1 | 6/2013 | Sindalovsky et al. | |
| 2013/0148712 A1 | 6/2013 | Malipatil et al. | |
| 2013/0169314 A1* | 7/2013 | Choudhary et al. | ............ 327/91 |

* cited by examiner

*Primary Examiner* — Leon Flores
(74) *Attorney, Agent, or Firm* — Okamoto & Benedicto LLP

(57) ABSTRACT

One embodiment relates to a method of adapting a receiver for equalization of an input data signal. A variable gain amplifier (VGA) loop adapts a VGA circuit using an initial threshold voltage so as to adjust a VGA gain setting to regulate a data amplitude feeding into a decision feedback equalization (DFE) circuit. In addition, the DFE adaptation loop may adapt the DFE circuit using the initial threshold voltage. When the adaptation of the VGA is done, then the VGA gain setting is frozen and adaptation of the threshold voltage may be performed by a threshold adaptation loop. Another embodiment relates to a system which includes a DFE adaptation circuit module, a CTLE adaptation circuit module, and a threshold adaptation circuit module that adapts a threshold voltage that is fed to the DFE adaptation circuit and the CTLE adaptation circuit. Other embodiments and features are also disclosed.

16 Claims, 31 Drawing Sheets

VGA adaptation method 500

Sign-sign LMS
520

Procedure for time-up and done 800

CTLE DC DAC Sequential Tables

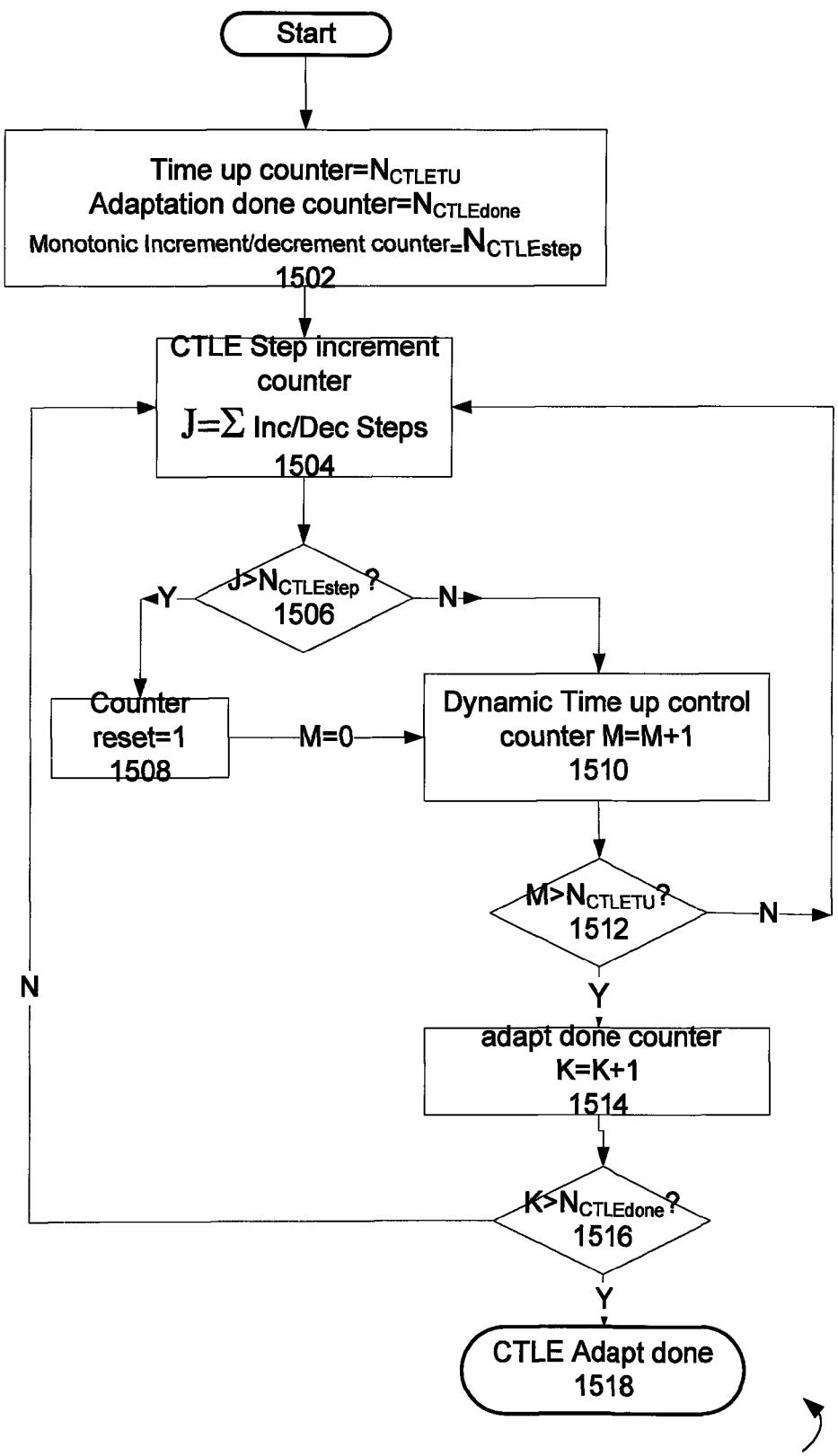
FIG. 15    1500

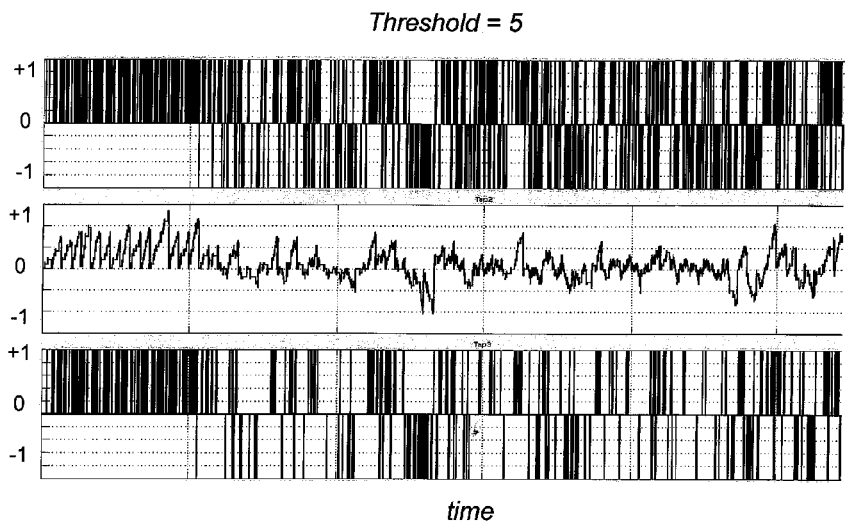
FIG. 17A
FIG. 17B
FIG. 17C
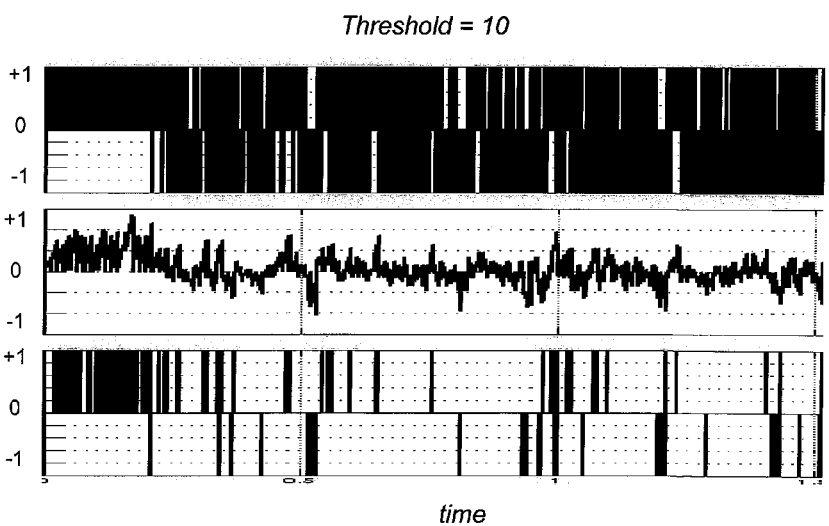
FIG. 17D
FIG. 17E
FIG. 17F

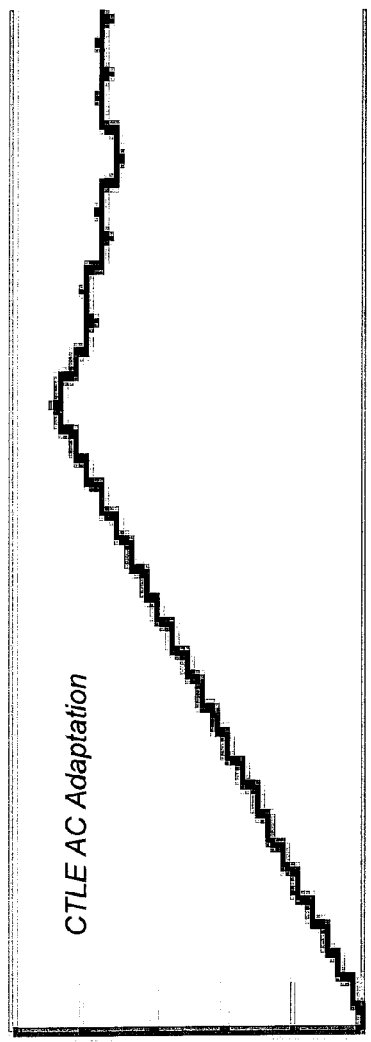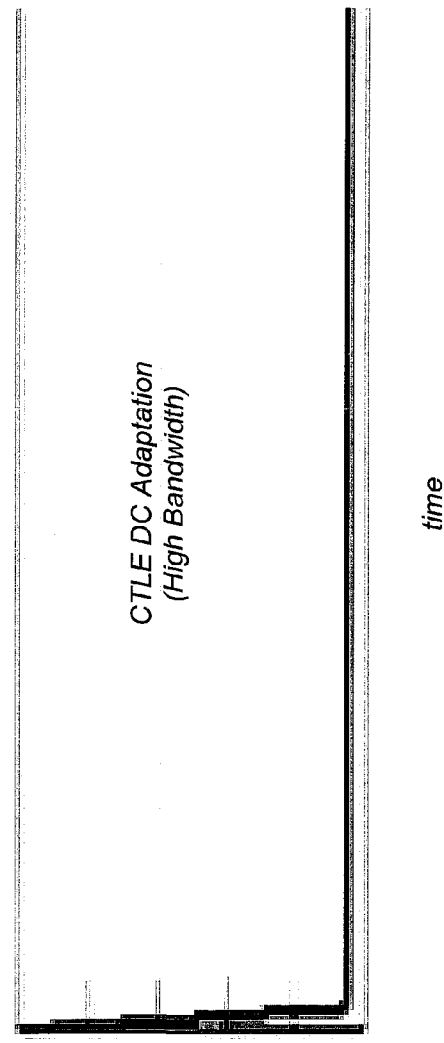
FIG. 18A
FIG. 18B

Multiple-tap feedback filter

SYSTEM AND METHOD FOR RECEIVER EQUALIZATION ADAPTATION

BACKGROUND

1. Technical Field

The present invention relates generally to data communications. More particularly, the present invention relates to circuitry for high-speed data links.

2. Description of the Background Art

High-speed data links are used to communicate data between devices in a system. Serial interface protocols have been developed at increasingly fast data rates for such high-speed data links.

SUMMARY

One embodiment relates to a method of adapting a receiver for equalization of an input data signal. A variable gain amplifier (VGA) loop adapts a VGA circuit using an initial threshold voltage so as to adjust a VGA gain setting to regulate a data amplitude feeding into a decision feedback equalization (DFE) circuit. In addition, the DFE adaptation loop may adapt the DFE circuit using the initial threshold voltage. When the adaptation of the VGA is done, then the VGA gain setting is frozen and adaptation of the threshold voltage may be performed by a threshold adaptation loop.

Another embodiment relates to a system for receiver equalization adaptation. The system includes a DFE adaptation circuit module that adapts a DFE circuit of a receiver, a CTLE adaptation circuit module that adapts a CTLE circuit of the receiver, and a threshold adaptation circuit module that adapts a threshold voltage that is fed to the DFE adaptation circuit and the CTLE adaptation circuit. The system may further include a VGA adaptation circuit module that adapts a VGA circuit.

Other embodiments and features are also disclosed.

BRIEF DESCRIPTION OF THE DRAWINGS

FIG. 15 is a flow chart of an exemplary implementation of a CTLE AC Time Up procedure which determines a CTLE Adaptation Done status in accordance with an embodiment of the invention.

FIGS. 17A through 17C depict results of error signal screening with a first threshold in accordance with an embodiment of the invention.

FIGS. 17D through 17F depict results of error signal screening using a second threshold in accordance with an embodiment of the invention.

FIGS. 18A and 18B depict CTLE AC and DC adaptations, respectively, in accordance with an embodiment of the invention.

DETAILED DESCRIPTION

Introduction

The high-speed signal in a receiver experiences loss through the channel, the package and the silicon interposer. The inter-symbol interference (ISI) becomes a more significant problem at high data rates. To complicate the problem, ISI can change over time, due to different data patterns, and with such varying conditions as temperature, bending and vibrations.

Due to the time-varying nature of ISI, effective receiver (RX) equalization (EQ) solutions should constantly, or very frequently, adapt to the changing channel and data traffic characteristics. RX EQ adaptation may track time-varying ISI so as to maintain signal quality. However, previous RX EQ adaptation solutions suffer many problems and difficulties.

For example, one previous solution utilizes two separate adaptation engines: an analog CTLE (continuous time linear equalization) adaptation engine; and a DFE (decision feedback equalization) adaptation engine.

Applicants have determined that problems and difficulties of previous solutions include the following. Limited equalization may be provided for DFE due to input amplitude variation. In addition, over or under equalization frequently occurs because of the application to DFE and CTLE of a fixed threshold voltage which may not be the natural average amplitude of a data stream. Furthermore, the analog CTLE adaptation engine may have a bandwidth limitation in the analog filter which is sensitive to PVT (process, voltage, or temperature) variations and mismatching. In addition, the adaptation step size may be too coarse for proper adaption of the DFE, and the search space for the CTLE may also be too limited. Furthermore, no correction may be made to compensate for channel reflections. Lastly, the simulation of RX EQ adaptation may use an inadequate system level simulation model.

"Wheel-Train" RX EQ Adaptation

The present disclosure provides a RX EQ adaptive engine that overcomes problems with previous solutions and systematically achieves an overall optimized equalization for the receiver. The overall optimized equalization achieves a very low bit-error rate (BER).

The disclosed RX EQ adaptive engine uses a "wheel-train" architecture (which is in some ways analogous to a wheel train in a mechanical watch). The wheel-train architecture provides multiple adaptation sub-engines or loops (i.e. multiple "wheels") that are interact with each other (i.e. that are part of a "wheel train"). Using these interdependent loops, the RX EQ adaptive engine may find the optimal equalization settings.

Figure 1:
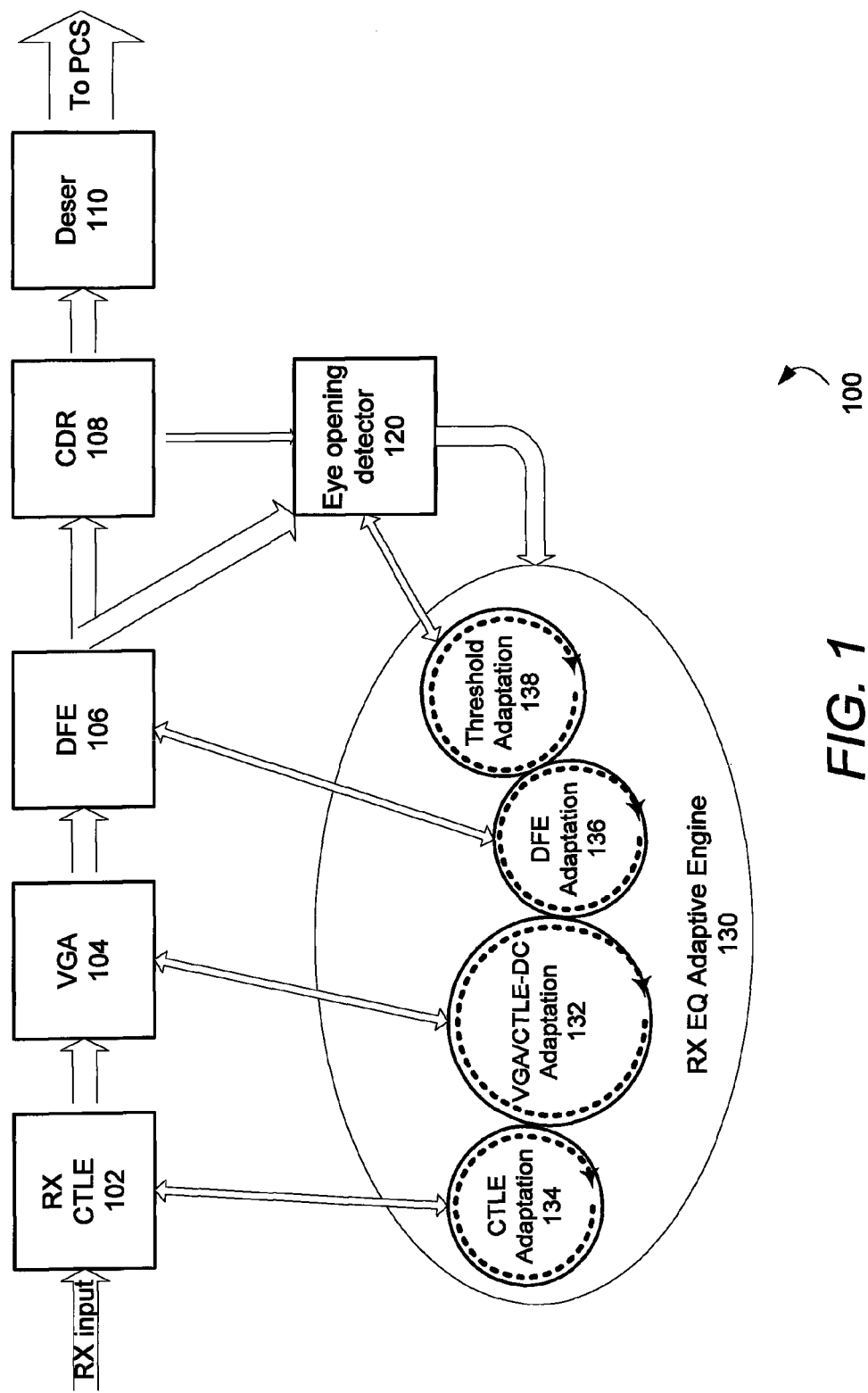
FIG. 1 depicts an exemplary wheel-train RX EQ adaptive engine for a receiver in accordance with an embodiment of the invention.

FIG. 1 depicts an exemplary receiver 100 with a wheel-train RX EQ adaptive engine 130 in accordance with an embodiment of the invention. The receiver 100 may be implemented on an integrated circuit and may be part of a transceiver circuit in some implementations.

As shown in FIG. 1, receiver 100 may perform equalization on a serial input (RX input) using a receiver continuous-time linear equalizer (RX CTLE) 102 combined with decision feedback equalization (DFE) 106 to overcome high-frequency losses through a transmission channel. As further shown in FIG. 1, a VGA 104 may be positioned after the CTLE 102 so as to provide a more constant amplitude for the signal input into the DFE 106. The output of the DFE 106 is provided to a clock data recovery (CDR) circuit 108. The data signal (and clock signal) recovered by the CDR 108 may be provided to a deserializer (Deser) 110. The output of the deserializer 110 may be provided to physical coding sublayer (PCS) circuitry.

As further shown, the receiver 100 may include an eye-opening detector 120 that receives the outputs of the DFE 106 and the CDR 108. The eye-opening detector 120 may be a circuit module for on-chip signal quality monitoring, such as an EyeQ circuit module which is commercially available from Altera Corporation of San Jose, Calif. The eye-opening detector 120 may provide data, such as signals indicative of the dimensions of the eye opening, to the RX EQ adaptive engine 130.

In the exemplary implementation that is depicted in FIG. 1, the RX EQ adaptive engine 130 includes a CTLE adaptation sub-engine 132, a VGA adaptation sub-engine 134, a DFE adaptation sub-engine 136 and a threshold adaption sub-engine 138. The sub-engines are also referred to herein as "loops" as they are implemented using procedural loops in accordance with an embodiment of the invention.

In accordance with an embodiment of the invention, the adaptation loops (132, 134, 136 and 138) may interact with each other such that the RX EQ adaptive engine 130 may find the optimal equalization settings for the receiver 100. In an exemplary implementation, various interactions between the loops are described herein.

Figure 2:
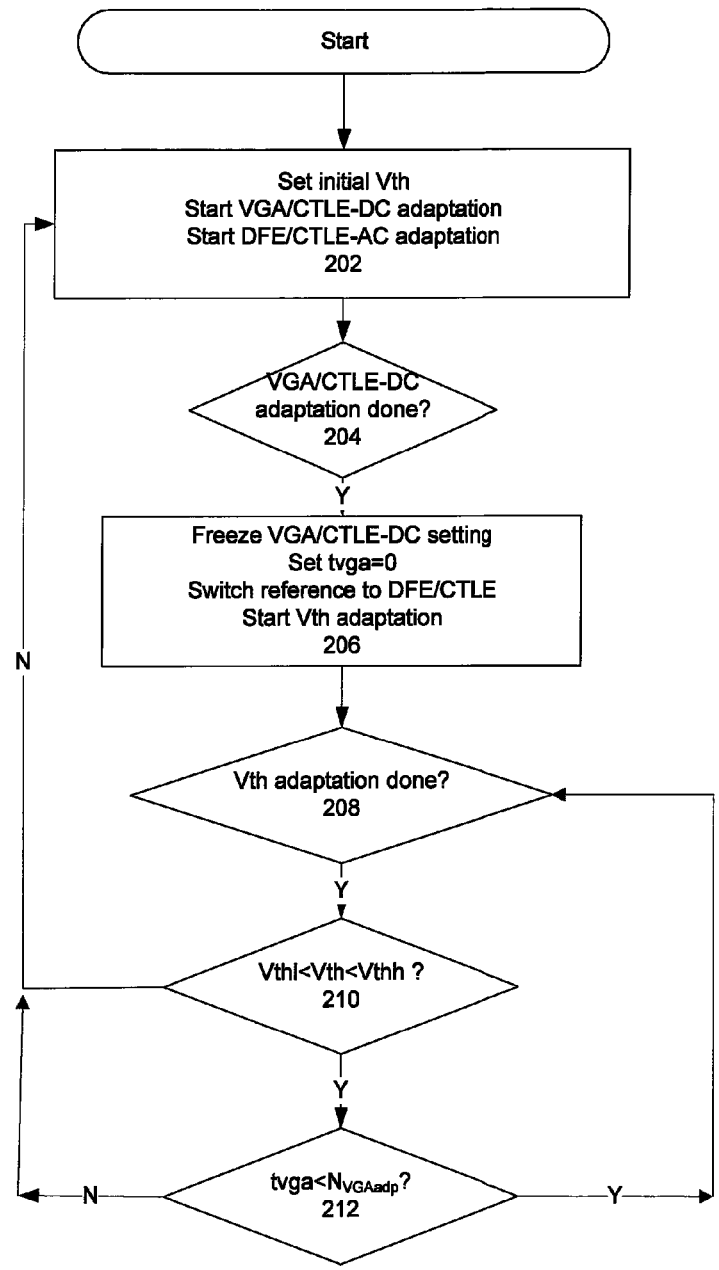
FIG. 2 is a flow chart of an exemplary method of adapting a receiver equalizer in accordance with an embodiment of the invention.

FIG. 2 is a flow chart of an exemplary method 200 of adapting a receiver equalizer (RX EQ) in accordance with an embodiment of the invention. Per step 202, a threshold voltage Vth may be set to an initial value, and the RX EQ adaptation may be started. In particular, the VGA/CTLE-DC adaptation (loop 132) may be started, and the DFE and CTLE-AC adaptations (loops 134 and 136) may be started using the initial Vth.

Per step 204, once it is determined that the VGA/CTLE-DC adaptation is done, then, per step 206, the VGA/CTLE-DC settings may be frozen, and the time interval tvga may be set to zero. Also in step 206, the reference to the DFE and CTLE adaptation loops (134 and 136) may be switched from the fixed initial Vth to the adapted Vth, and the adaptation of Vth may be started by the Vth adaptation loop 138.

Per step 208, once it is determined that the Vth adaptation is done, then a check is made, per step 210, as to whether the adapted Vth is between a lower threshold floor Vthl, and an upper threshold ceiling Vthh. If the adapted Vth is below Vthl or above Vthh, then the method 200 may loop back to step 202 where a different initial Vth may be set.

Otherwise, if the adapted Vth is between Vthl and Vthh, then a determination may be made, per step 212, as to whether the time interval tvga is less than a threshold value $N_{VGAadp}$. If tvga is less than $N_{VGAadp}$, then the method 200 may loop back to step 208 and continue to wait until sufficient time has past since the VGA setting was frozen. Once tvga is less than $N_{VGAadp}$, then sufficient time has past, so the method 200 loops back to step 202 so as to trigger another VGA adaptation.

Figure 3:
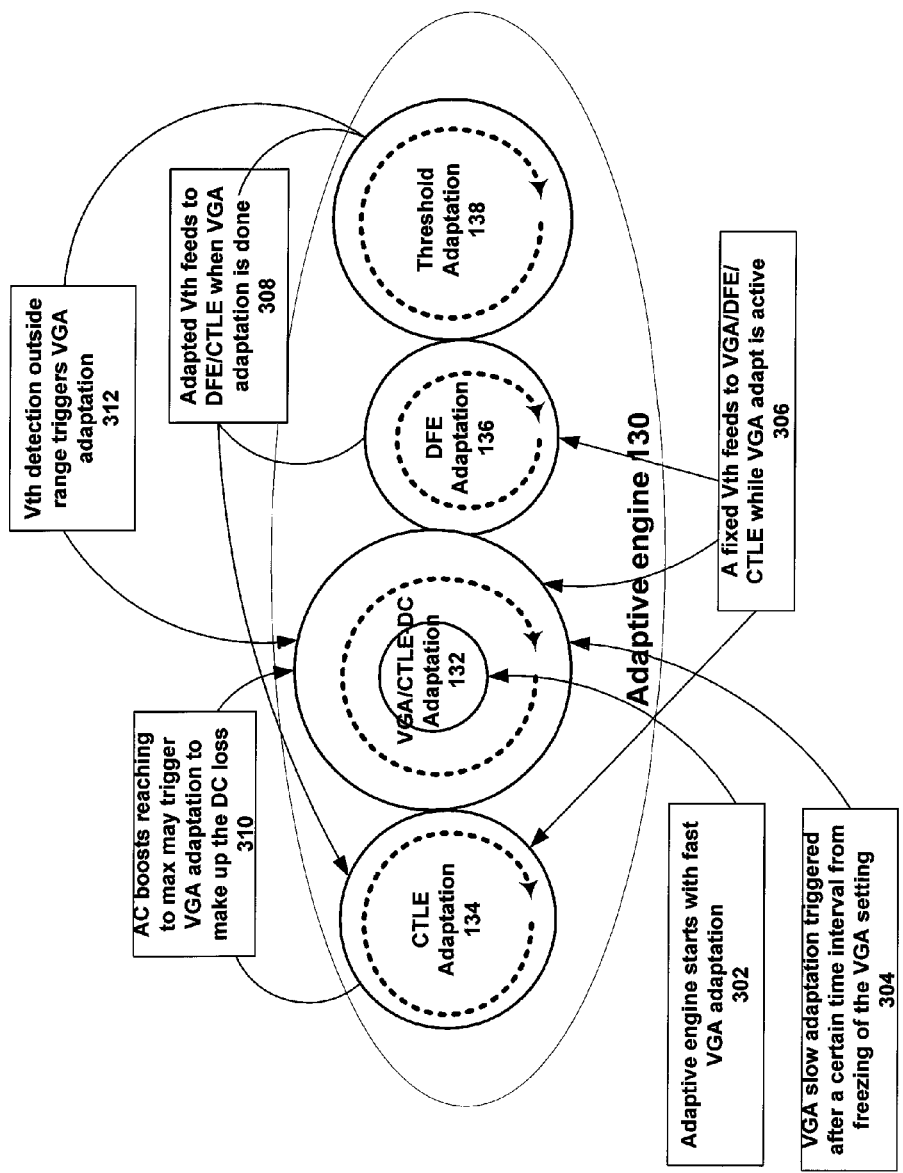
FIG. 3 depicts various aspects of a wheel-train adaptive engine in accordance with an embodiment of the invention.

FIG. 3 depicts various aspects of a wheel train adaptive engine 130 in accordance with an embodiment of the invention. These aspects include exemplary interactions and triggers involving two or more of the adaptation loops As indicated in block 302, the adaptation engine 130 may start with a fast VGA adaptation using the VGA adaptation loop 132. The fast VGA adaptation may involve a higher bandwidth setting with larger changes in gain per step. Further, as indicated in block 304, a slow VGA adaptation may be triggered a predetermined time after the VGA adaptation loop 132 freezes the VGA setting. The slow VGA adaptation may involve a lower bandwidth setting with smaller changes in gain per step.

Per block 306, while the VGA adaptation loop 132 is active, a fixed threshold voltage Vth feeds into the VGA adaptation loop 132, the DFE adaptation loop 136, and the CTLE adaptation loop 134. However, as indicated in block 308, when the VGA adaptation is done, then the switch is made such that the adaptive threshold voltage Vth from the threshold adaptation loop 138 feeds into the DFE adaptation loop 136 and the CTLE adaptation loop 134. Thus, the threshold adaptation loop 138 interacts with both the DFE adaptation loop 136 and the CTLE adaptation loop 134.

During execution of the CTLE adaptation loop 134, the frequency (AC) boosts may reach a maximum limit. As indicated in block 310, this may trigger the VGA adaptation loop 132 to make up the DC loss. Thus, the CTLE adaptation loop 134 interacts with the VGA adaptation loop 132.

In addition, during execution of the threshold adaptation loop 138, the threshold voltage Vth may be detected to be outside of a predetermined range. As indicated in block 312, this may also trigger a VGA adaptation. This triggering is an interaction between the threshold adaptation loop 138 and the VGA adaptation loop 132. Thus, the threshold adaptation loop 138 interacts with the VGA adaptation loop 132.

Figure 4A:
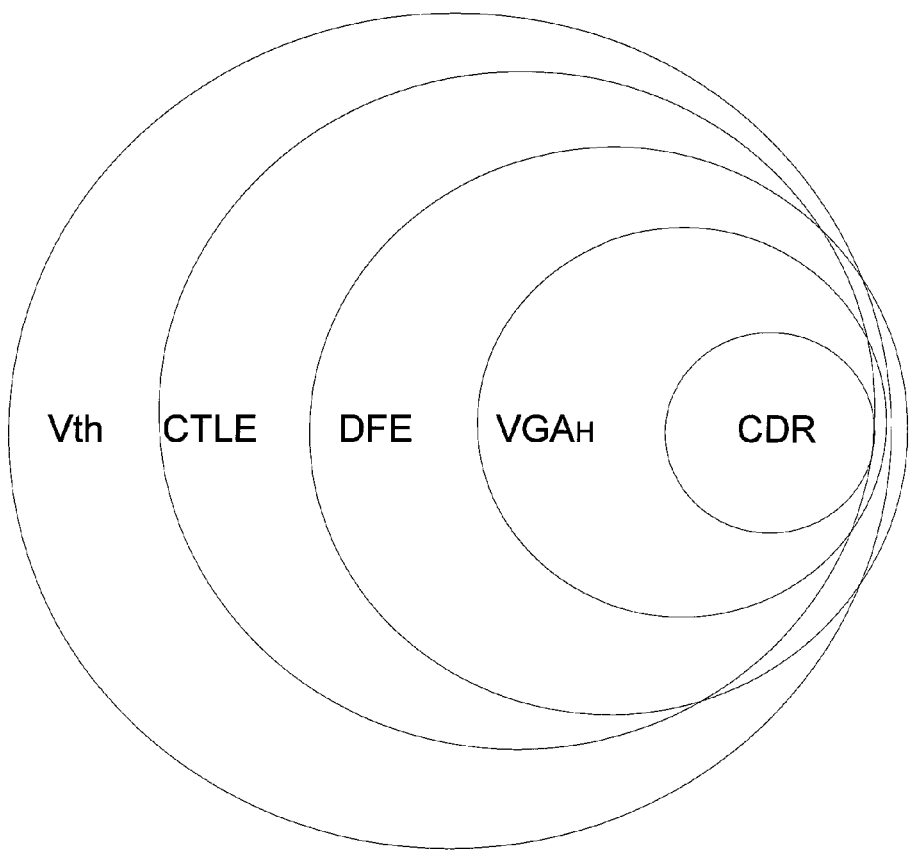
FIG. 4A depicts the relationship between adaptation loop bandwidths in accordance with an embodiment of the invention.

FIG. 4A depicts the relationship between loop bandwidths in accordance with an embodiment of the invention. The bandwidth of a loop relates to the range of variation in the setting of interest that may be implemented by the loop. For example, the loop bandwidth may be set by setting a bandwidth counter for the loop, where a larger value for the bandwidth counter results in fewer (slower) updates which corresponds to a smaller bandwidth, while a smaller value for the bandwidth counter results in more frequent (faster) updates which corresponds to a larger bandwidth. In FIG. 4A, a smaller circle or "wheel" corresponds to a larger bandwidth or faster loop, and a larger circle or "wheel" corresponds to a smaller bandwidth or slower loop.

In accordance with an embodiment of the invention, the interactions between the adaptation loops within the adaptive engine 130 results in the relationship between bandwidths depicted in FIG. 4A. As shown, the CDR loop may have the largest bandwidth. The CDR loop bandwidth may be set to minimize receiver jitter. As further shown, due to the loop interactions within the adaptive engine 130, the VGA adaptation loop (in a high-bandwidth mode indicated by the H subscript) has the second largest bandwidth. The DFE adaptation loop has the third largest bandwidth. The CTLE AC adaptation loop has the fourth largest bandwidth. Finally, the VTH adaptation loop has the smallest bandwidth.

Figure 4B:
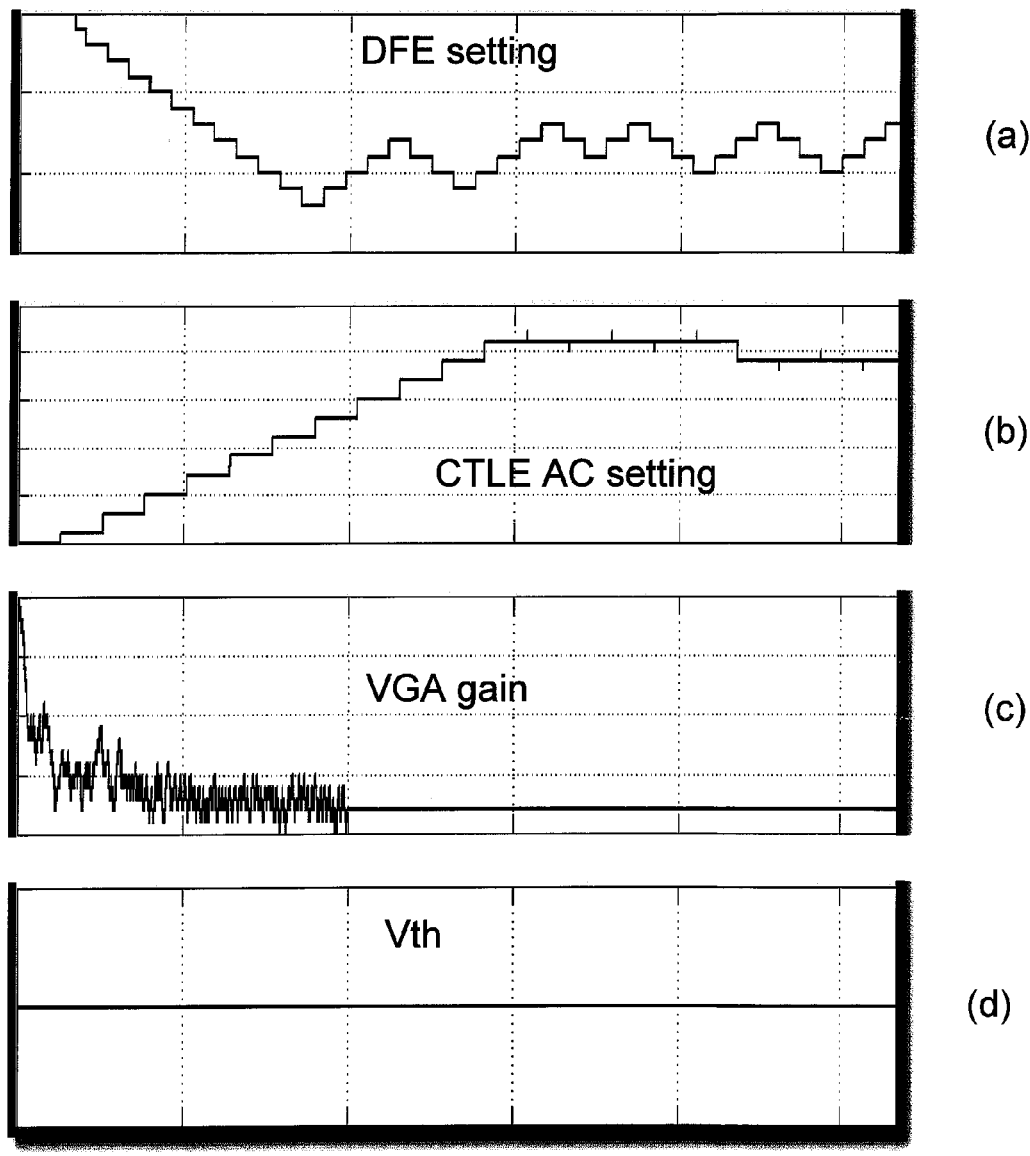
FIG. 4B depicts results from a simulation of the RX EQ adaptation system to illustrate the relationship between adaptation loop bandwidths in accordance with an embodiment of the invention.

FIG. 4B depicts results from a simulation of the RX EQ adaptation system to illustrate the relationship between adaptation loop bandwidths in accordance with an embodiment of the invention. As shown in graph (a), the DFE adaptation converges in a first phase, and then makes further tap adjustments in a second phase. As shown in graph (b), the CTLE AC adaptation has a smaller bandwidth than the DFE adaptation. As illustrated by graph (c), the VGA/CTLE-DC adaptation converges quickly with a fast loop then is switched to fixed settings. As illustrated by graph (d), the Vth adaptation is the slowest loop.

Figure 4C:
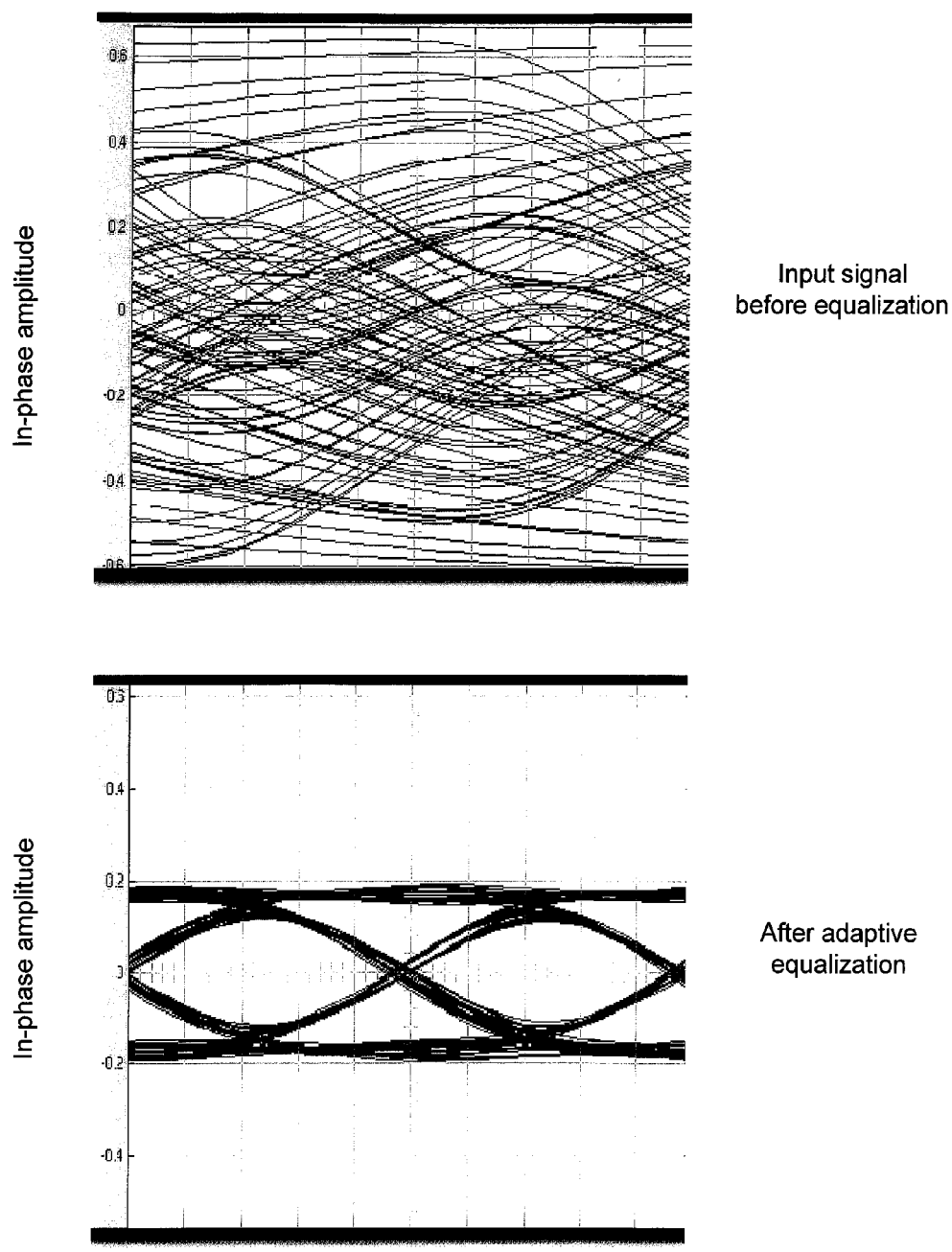
FIG. 4C depicts an example eye diagram of an input signal before and after adaptive equalization in accordance with an embodiment of the invention.

FIG. 4C depicts an example eye diagram of an input signal before and after adaptive equalization in accordance with an embodiment of the invention. As shown, the eye diagram after adaptive equalization shows that adaptive equalization is highly successful with a clean and large eye opening.

As described herein, the various loops in the adaptive engine 130 operate interdependently (i.e. work together) to achieve an optimal level of equalization. Amplitude adaptation is accomplished by both the VGA loop and the CTLE DC loop. The VGA plays a DC amplitude balance role in the CTLE AC adaptation to ensure overall amplitude regulation to achieve an optimal AC boosting. Threshold adaptation enables optimized equalization of both the CTLE and the DFE.

In an exemplary implementation, the DFE may be implemented with seven fixed taps and four floating taps to cancel intersymbol interference and reflections. The CTLE AC boosting may be implemented with a DAC array with 64 settings per stage. The bandwidths for the DFE, CTLE, Vth and VGA adaptation loops may be programmable. In addition, one-time adaptation and continuous adaptation modes may be available for selection.

Exemplary Implementation of VGA Adaptation Loop

This section describes an exemplary implementation of a VGA adaptation loop in accordance with an embodiment of the invention.

Figure 5:
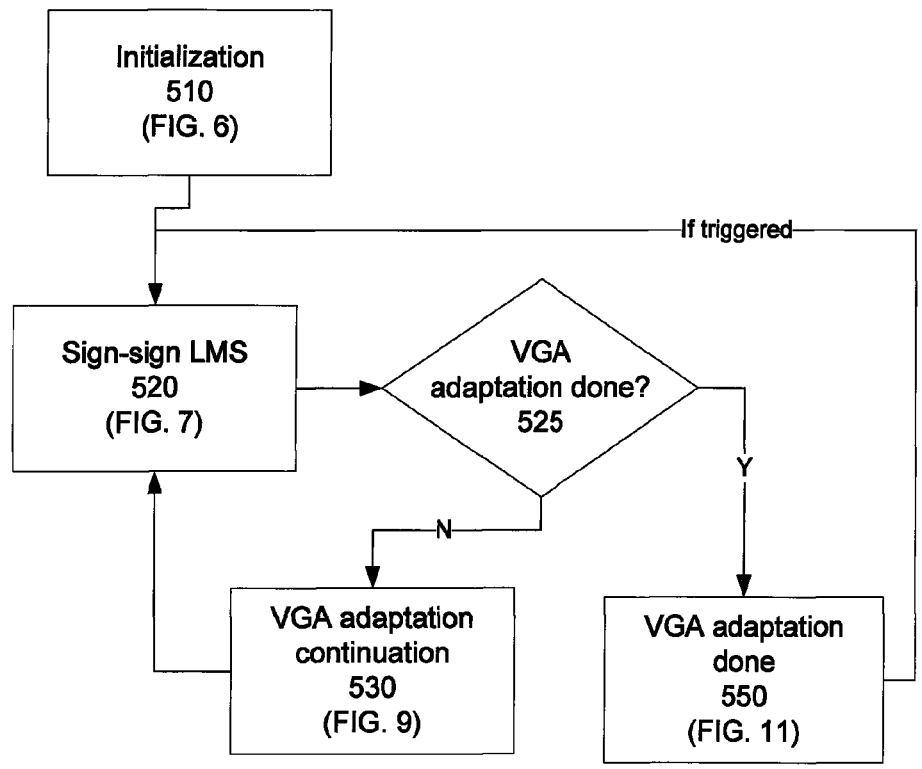
FIG. 5 is a flow chart of a method for VGA adaptation in accordance with an embodiment of the invention.

FIG. 5 is a flow chart of an exemplary method 200 for VGA adaptation in accordance with an embodiment of the invention. In one implementation, the method 500 may be implemented using the VGA/CTLE-DC adaptation loop 132 of FIG. 1. As shown in FIG. 5, the method 500 may begin with an initialization procedure 510. An exemplary implementation of the initialization procedure 510 is described below in relation to FIG. 6.

After the initialization procedure 510, a sign-sign least mean squares (LMS) procedure 520 may be performed until the VGA gain is within a specified range such that convergence is detected. An exemplary implementation of the sign-sign LMS procedure 520 is described below in relation to FIG. 7.

Figure 8A:
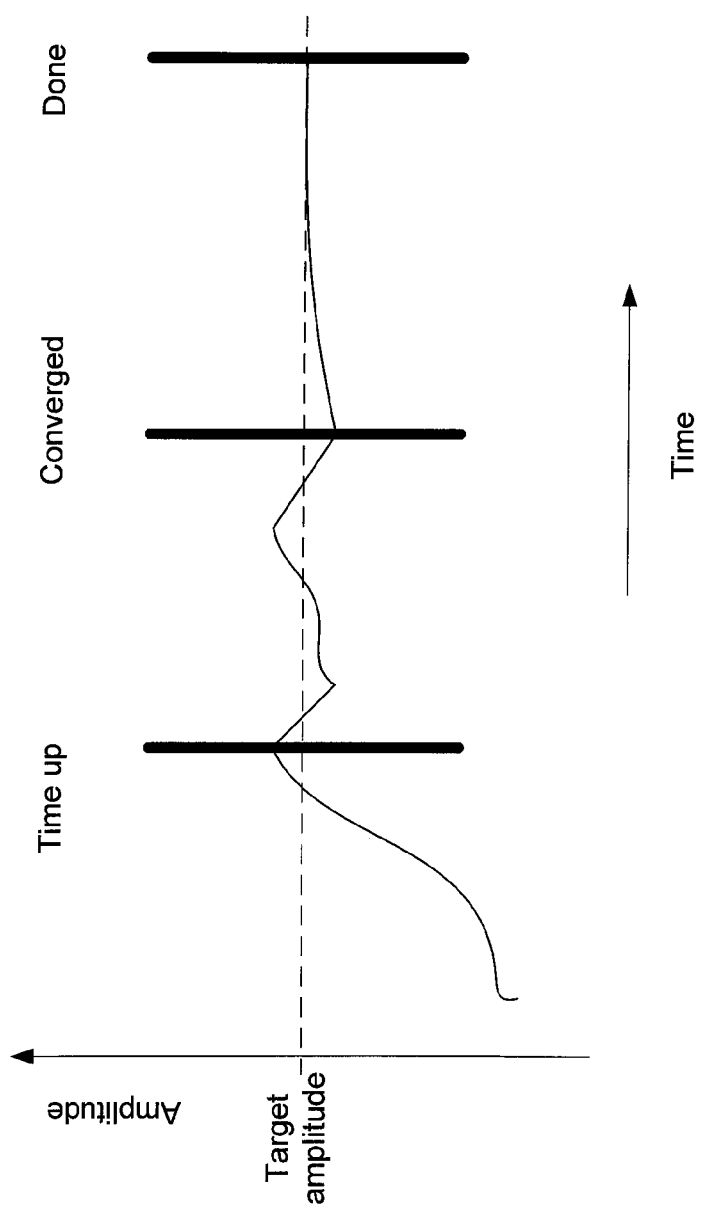
FIG. 8A is an example graph depicting VGA adaptation time-up, converged, and done conditions in accordance with an embodiment of the invention.
Figure 8B:
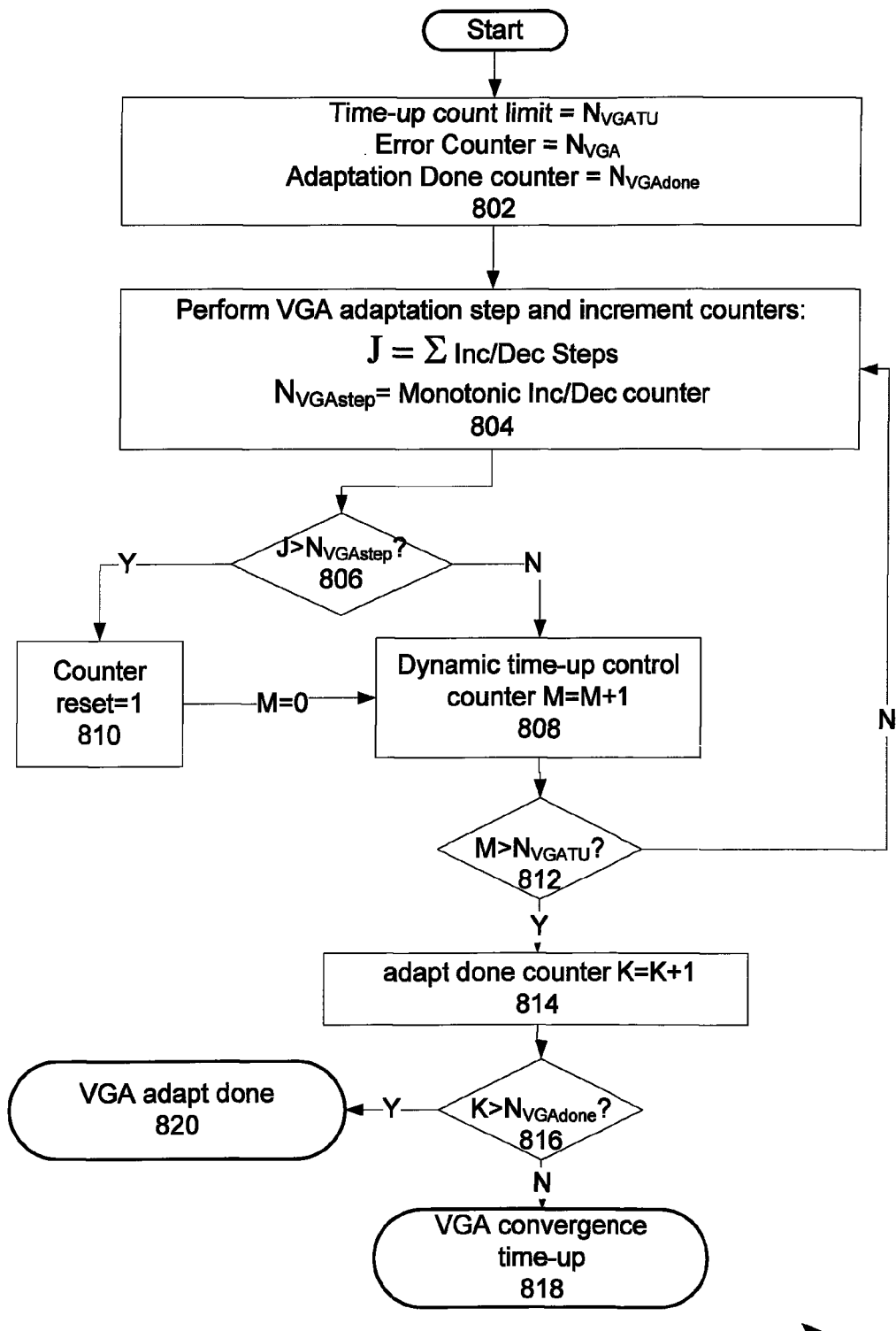
FIG. 8B depicts a flow chart of a procedure for determining VGA convergence time-up and VGA adaptation done in accordance with an embodiment of the invention.

After convergence is detected, the method 500 may move forward to block 525 and determine whether or not VGA adaptation is "done". In one implementation, VGA adaptation is considered as done if a VGA adaptation done flag is set. Described below in relation to FIGS. 8A and 8B is an exemplary implementation of a procedure 800 for setting the VGA adaptation done flag.

If the VGA adaptation is determined to not yet be done per block 525, then the adaptation continues per the VGA-adaptation-continuation procedure 530. An exemplary implementation of the VGA-adaptation-continuation procedure 530 is described below in relation to FIG. 6. In accordance with an embodiment of the invention, during the VGA-adaptation-continuation procedure 530, a CTLE DC adaptation may be performed. Thereafter, the method 500 loops back to the sign-sign LMS procedure 520.

Once the VGA adaptation is determined to be done per block 525, then the adaptation continues per the VGA-adaptation-done procedure 550. An exemplary implementation of the VGA-adaptation-done procedure 550 is described below in relation to FIG. 11. If the VGA adaptation was a triggered adaptation, then the method 500 loops back to the sign-sign LMS procedure 520. Otherwise, if the VGA adaptation was a non-triggered adaptation, such as a one-time adaptation, then the method 500 may end (i.e. be complete or done) in the VGA-adaptation-done procedure 550.

Figure 6:
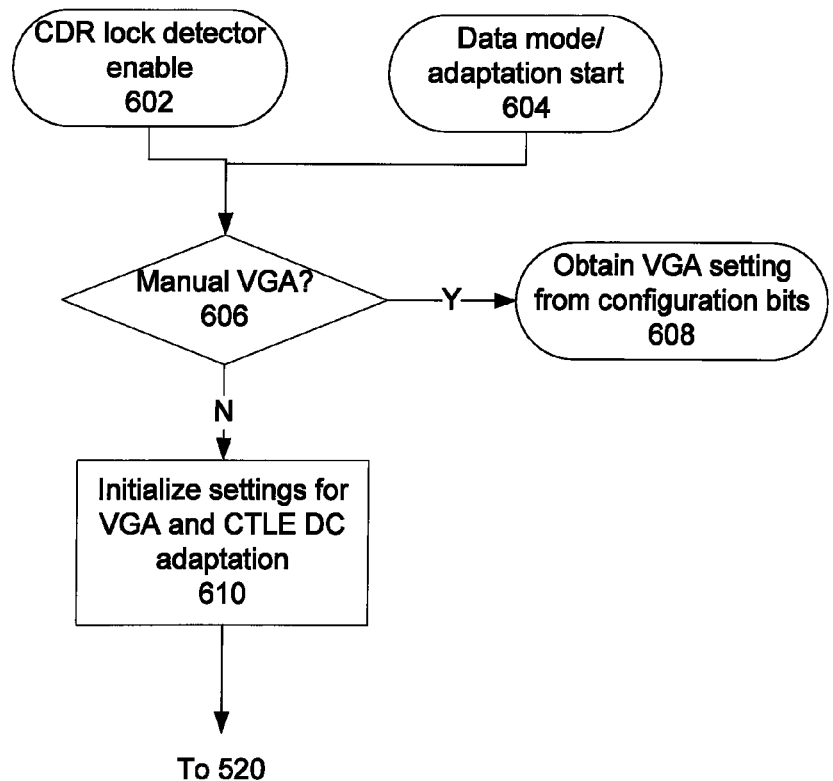
FIG. 6 is a flow chart of an initialization procedure in accordance with an embodiment of the invention.

FIG. 6 is a flow chart of an initialization procedure 510 in accordance with an embodiment of the invention. The procedure 510 may start when either a clock data recover (CDR) lock detector is enabled 602 or a data mode or adaptation is started 604. Thereafter, a determination 604 may be made as to whether or not the system is set to a manual VGA mode. In such a manual VGA mode, the VGA is set to a fixed gain. Hence, if the system is set to the manual VGA mode, then the VGA setting may be obtained 608 from configuration bits.

On the other hand, if the system is not set to the manual VGA mode, then the settings for the VGA and CTLE DC adaptation may be initialized 610. In an exemplary implementation, the initialization of the settings may include: setting an initial voltage threshold (Vth); setting the initial gain for the VGA (VGA initial) to 0 dB; setting the initial value for the error count ($N_{VGA}$) to an initial low error count ($N_{VGAL}$); setting the VGA maximum and minimum digital-to-analog converter (DAC) values to $M_{max}$ and $M_{min}$, respectively; and setting the initial gain for the CTLE DC to 0 dB. After initializing the settings, the method 500 may proceed to the sign-sign LMS procedure 520.

Figure 7:
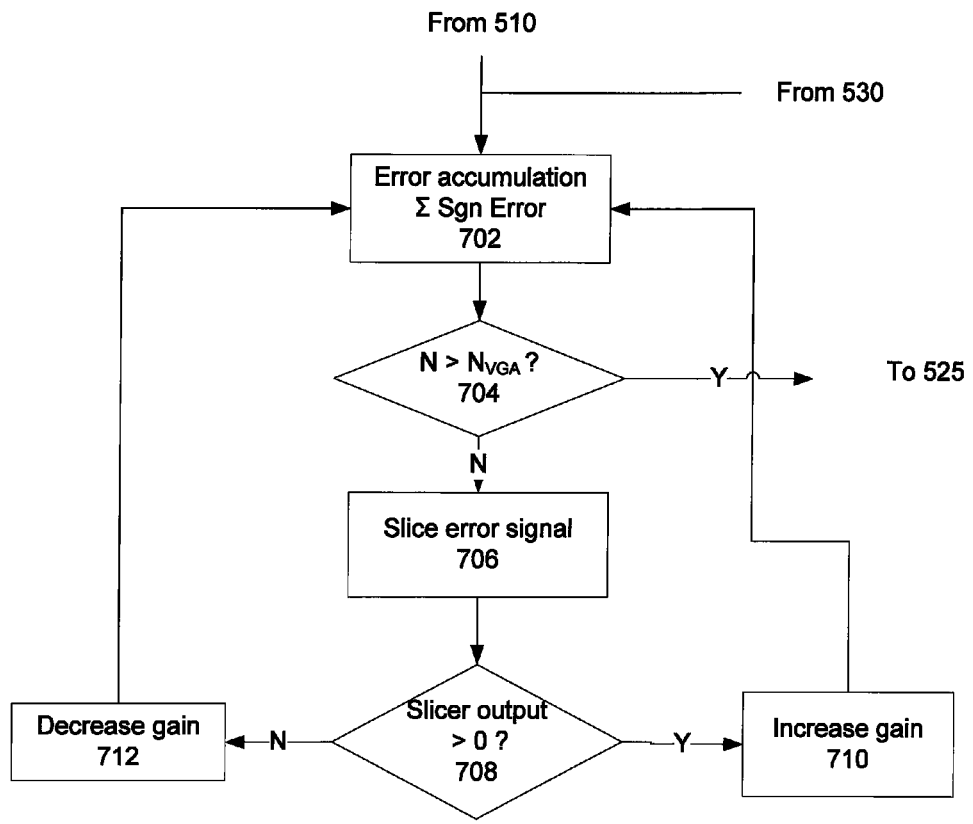
FIG. 7 is a flow chart of a sign-sign LMS procedure in accordance with an embodiment of the invention.

FIG. 7 is a flow chart of a sign-sign LMS procedure 520 in accordance with an embodiment of the invention. Error accumulation may be performed per block 702. The error accumulation may involve a summation of the signs of detected errors (Σ Sgn Error).

Per block 704, after a predetermined period of accumulation, a determination may be made as to whether the VGA update counter N is greater than the error counter $N_{VGA}$. If VGA update counter N is less than or equal to the error counter $N_{VGA}$, then an error slicer may be applied per block 706 to generate a slice error signal. Per block 708, if the slicer output is greater than zero (i.e. positive), then the gain for the VGA may be increased per block 710, while if the slicer output is less than zero (i.e. negative), then the gain for the VGA may be decreased per block 712. The procedure 520 may then loop back to further accumulate error per block 702. Once it is determined that N is greater than $N_{VGA}$, then the method 500 may proceed to block 525 in which a determination is made as to whether or not the VGA adaptation is "done".

FIG. 8A is an example graph depicting VGA adaptation "time-up", "converged", and "done" conditions in accordance with an embodiment of the invention. As depicted, during an initial period in the VGA adaptation before VGA adaptation "time-up", the adaptation of the gain occurs rapidly (i.e. at high bandwidth). Thereafter, in accordance with an embodiment of the invention, the VGA adaptation may be switched from a high bandwidth setting (i.e. larger changes in gain per step) to low bandwidth setting (i.e. smaller changes in gain per step). Thereafter, the VGA adaptation may continue until the VGA adaptation "converged" condition is met. Finally, the VGA adaptation may be deemed as "done" if the converged condition has been met for a sufficiently long period of time.

FIG. 8B depicts a flow chart of a procedure 800 for determining VGA convergence time-up and VGA adaptation done in accordance with an embodiment of the invention. Note that this procedure 800 executes in parallel with the steps of the method 500 shown in FIG. 5. In one implementation, the following counts may be set per block 802: time-up count $N_{VGATU}$; and adaptation done count $N_{VGAdone}$. Both these counts may be set to predetermined (i.e. electronically programmed) values.

Per block 804, a VGA step counter J may be incremented for either increment or decrement steps, while a monotonic step counter $N_{VGAstep}$ may be incremented or decremented only while the gain is being incremented or decremented monotonically.

Per block 806, the value of the VGA step counter J may be compared against the value of the monotonic counter $N_{VGAstep}$. If J=$N_{VGAstep}$, then the gain adjustment remains monotonic (either monotonically incremented or monotonically decremented). In this case, per block 808, the dynamic time-up control counter M is incremented.

On the other hand, if J>$N_{VGAstep}$, then a change in sign has occurred such that the gain adjustment has gone from being incremented to being decremented, or vice-versa. In that case, per block 810, both counters J and $N_{VGAstep}$ are reset to one, and the dynamic time-up control counter M is reset to zero.

Per block 812, a determination may then be made as to whether M is greater than the time-up count $N_{VGATU}$. If not, then the procedure 800 may loop back to block 804.

Once M>$N_{VGATU}$, then the adaptation done counter K may be incremented per block 814. Per block 816, a determination may be made as to whether the adaptation done counter K is greater than the adaptation done count limit $N_{VGAdone}$. If not, then the VGA convergence "time-up" flag may be set per block 818, and the bandwidth for the adaptation may be lowered as discussed above. If so, then the VGA adaptation done flag may be set per block 820, indicating that the VGA adaptation is deemed "done" as discussed above.

Figure 9:
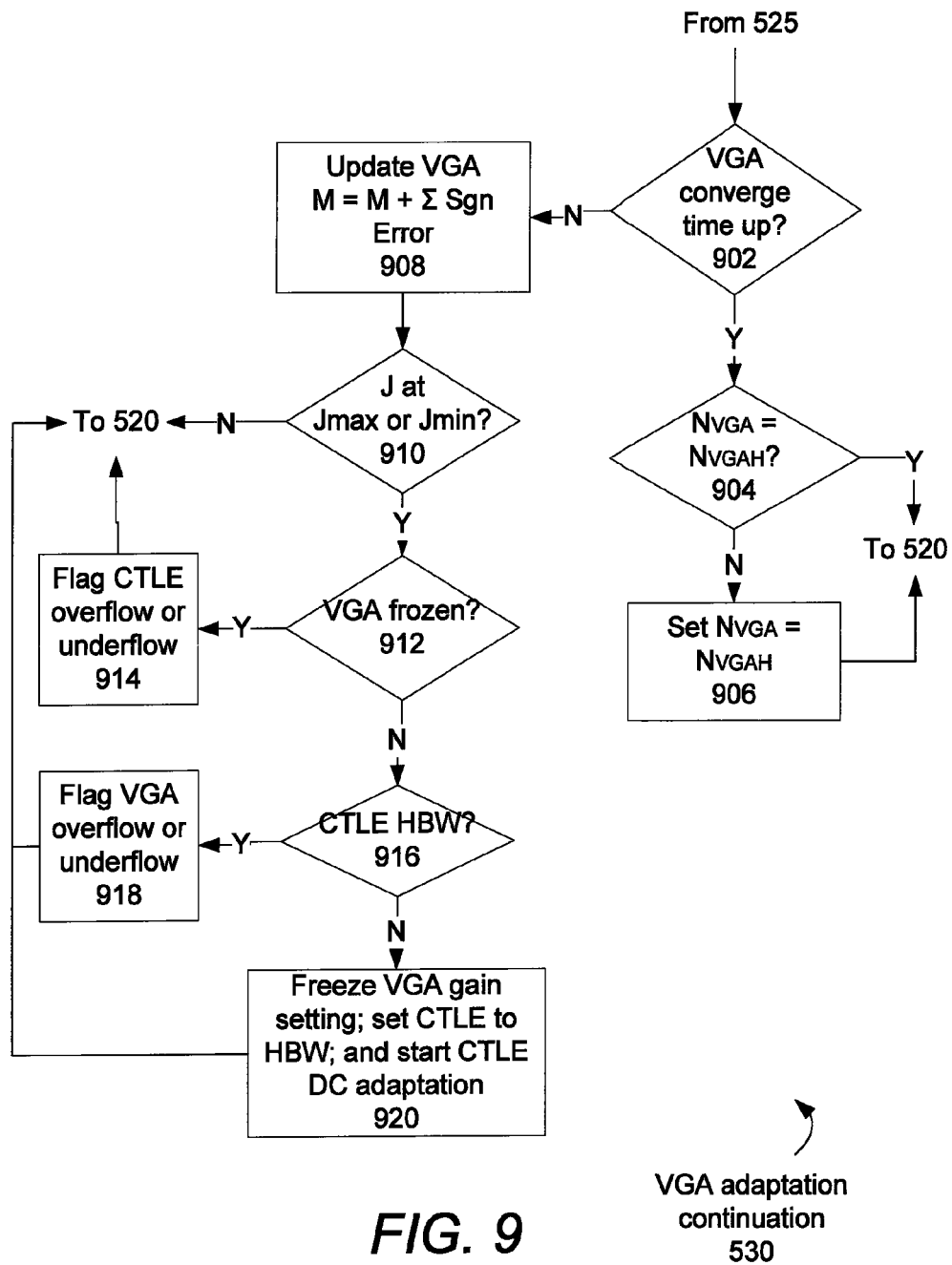
FIG. 9 is a flow chart of a VGA-adaptation-continuation procedure in accordance with an embodiment of the invention.

FIG. 9 is a flow chart of a VGA-adaptation-continuation procedure 530 in accordance with an embodiment of the invention. This procedure 530 begins after it is determined, per block 525, that VGA adaptation is not "done". In this case, a determination may then be made, per block 902, as to whether the VGA convergence "time-up" flag has been set.

If the convergence "time-up" flag is set per block 902, then the process is at or after the "time-up" point, but before the "done" point, in FIG. 8A. In this case, the error counter $N_{VGA}$ is set to the high error count $N_{VGAH}$ (if not already) per blocks 904 and 906. Thereafter, the method 500 may loop back and again perform the sign-sign LMS procedure 520.

If the convergence "time-up" flag is not set per block 902, then the process is before the "time-up" point in FIG. 8A. In this case, the VGA gain J is updated by incrementing it based on the accumulated sign error per block 908.

Per block 910, a determination may be made as to whether the updated VGA gain J is at a maximum or minimum allowed value ($J_{max}$ or $J_{min}$, respectively). If J is not at $J_{max}$ or $J_{min}$, then the method 500 may loop back and again perform the sign-sign LMS procedure 520. If J=$J_{max}$ or $J_{min}$, then a further determination may be made, per block 912, as to whether the VGA setting has already been frozen, and if so, then a CTLE overflow (if J=$J_{max}$) or underflow (if J=$J_{min}$) may be flagged per block 914.

Otherwise, the VGA setting is not already frozen, then a further determination may be made, per block 916, as to whether the CTLE DC adaptation is set to a higher bandwidth setting, rather than a lower bandwidth setting. If the CTLE DC adaptation is already set to the higher bandwidth setting, then a VGA overflow or underflow may be flagged per block 918. Otherwise, if the CTLE DC adaptation is set to not set to the higher bandwidth setting, then, per block 920, the VGA gain setting may be frozen, the CTLE DC adaptation may be set to the higher bandwidth setting, and the CTLE DC adaptation may be performed. An exemplary implementation of DAC sequence for the CTLE DC adaptation is described below in relation to FIG. 10.

Figure 10:
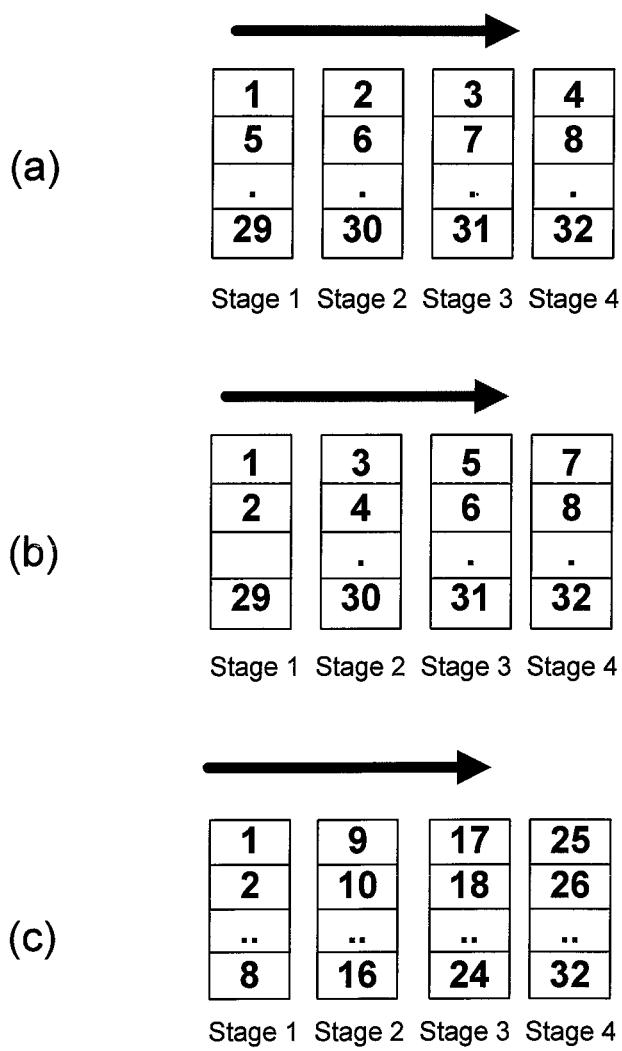
FIG. 10 is a diagram showing exemplary digital-to-analog conversion (DAC) sequential tables for CTLE DC adaptation in accordance with an embodiment of the invention.

FIG. 10 is a diagram showing exemplary DAC sequential tables for CTLE DC adaptation in accordance with an embodiment of the invention. In this example, the CTLE has four stages, and three exemplary DAC sequential tables are shown.

The first sequential table (a) provides a first sequence which may be used as a default sequence. In this sequence, the first (weakest) stage may be set to a first (lowest) setting, then the second stage may be set to the first (lowest) setting, then the third stage may be set to the first (lowest) setting, then the fourth (strongest) stage may be set to the first (lowest) setting. These first four settings in the sequence are denoted 1, 2, 3 and 4 in the first row. For the fifth through eighth settings in the sequence, the first stage may be set to a second setting, then the second stage may be set to the second setting, then the third stage may be set to the second setting, then the fourth stage may be set to the second setting. These next four settings in the sequence are denoted 5, 6, 7, and 8 in the second row. And so on, until the $29^{th}$ through $32^{nd}$ in the sequence, in which the first through fourth stages, respectively, may be set to the eighth setting.

The second sequential table (b) provides a second sequence which may be used for small signals. In this sequence, the first stage may be set to a first (lowest) setting, then the first stage may be set to a second setting, then the second stage may be set to the first (lowest) setting, then second stage may be set to a second setting, then the third stage may be set to the first (lowest) setting, then the third stage may be set to a second setting, then the fourth stage may be set to the first (lowest) setting, then the fourth stage may be set to the second setting. These first eight settings in the sequence are denoted 1, 2, 3, 4, 5, 6, 7 and 8 in the first two rows. Similarly for the next group of eight settings in the sequence, and so on.

The third sequential table (c) provides a third sequence which may be used for very small signals. In this sequence, the first stage may be set to a first (lowest) setting, then a second setting, then a third setting, and so on, until an eight (highest) setting. These first eight settings in the sequence are denoted 1, 2, . . . , 8 in the first column. The next eight settings in the sequence pertain to the second stage and are denoted 9, 10, . . . , 16 in the second column. Similarly, the next group of eight settings pertain to the third stage and are denoted 17 through 24 in the fourth column. Finally, the last group of eight settings pertain to the fourth stage and are denoted 25 through 32 in the fourth column.

Figure 11:
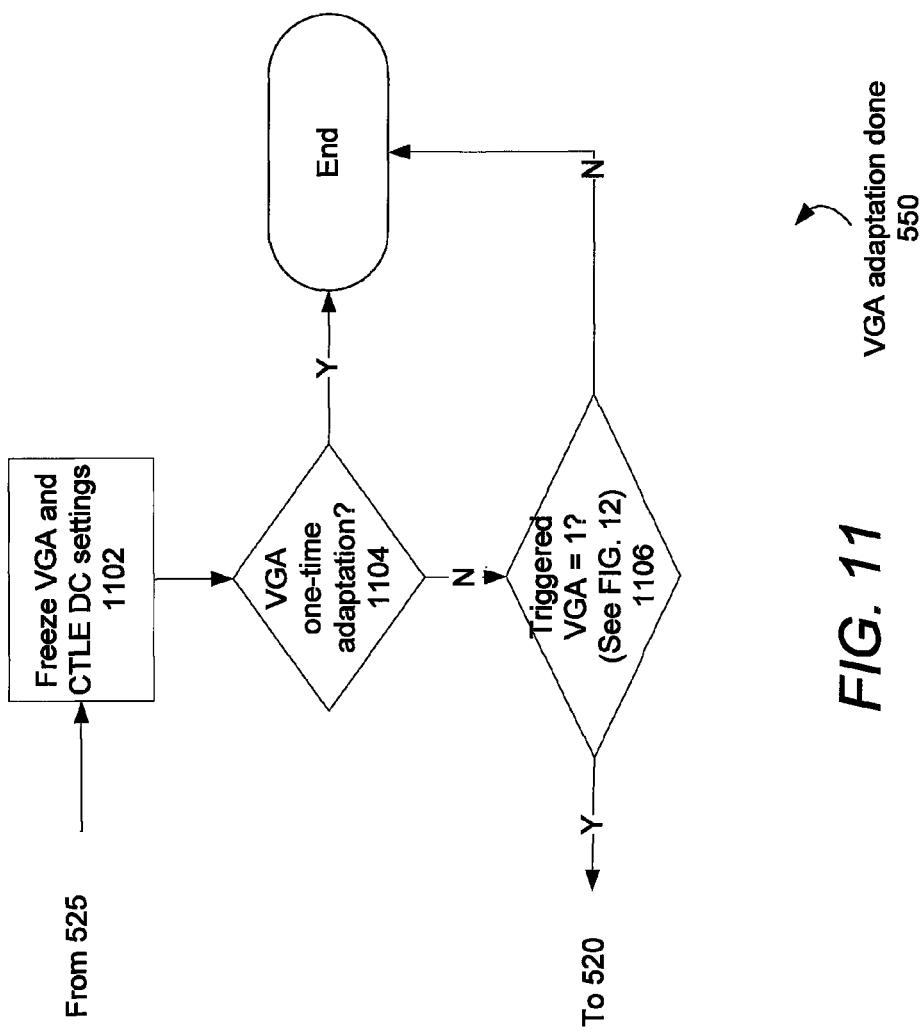
FIG. 11 is a flow chart of a VGA-adaptation-done procedure in accordance with an embodiment of the invention.

FIG. 11 is a flow chart of a VGA-adaptation-done procedure 550 in accordance with an embodiment of the invention. This procedure 550 is performed if the VGA adaptation is determined to be done per block 525.

Per block 1102, the VGA and CTLE DC settings are frozen. A determination may be made, per block 1104, whether the VGA adaptation was performed as a one-time adaptation. If so, then the method 500 may end. Otherwise, a further determination may be made, per block 1106, as to whether the VGA adaptation was triggered. For example, this may be indicated by a triggered VGA flag being set to one. If the VGA adaptation was not triggered, then the method 500 may end. Otherwise, if the VGA adaptation was triggered, then the method 500 may loop back to the sign-sign LMS procedure 520.

Figure 12:
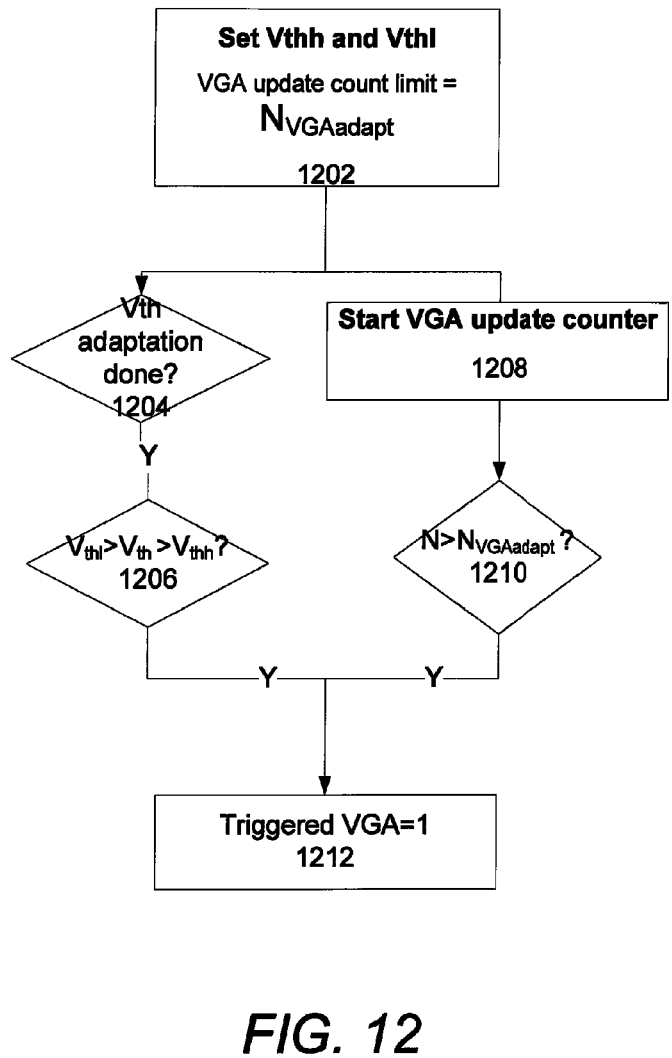
FIG. 12 is a flow chart for triggering a VGA adaptation in accordance with an embodiment of the invention.

FIG. 12 is a flow chart of a procedure 1200 to determine whether triggering a VGA adaptation in accordance with an embodiment of the invention. Per block 1202, high-level and low-level threshold voltages may be set to predetermined voltages Vthh and Vthl, respectively, and a VGA update count limit may be set to a predetermined count $N_{VGAadapt}$. After block 1202, the procedure 1200 may proceed in parallel along two branches: a first branch (blocks 1204 and 1206) relating to a threshold migration trigger; and a second branch (blocks 1208 and 1210) relating to a VGA timer trigger.

In the first branch, adaptation of the threshold voltage Vth is performed. When the Vth adaptation is done per block 1208, then Vth may be compared against the low and high thresholds Vthl and Vthh per block 1210. If Vth is below Vthl or above Vthh (i.e. outside the range bounded by Vthl and Vthh), then the triggered VGA flag may be set to one per block 1212.

In the second branch, the VGA update counter N may be started per block 1208. Per block 1210, the VGA update counter N is monitored and compared against $N_{VGAadapt}$. When $N > N_{VGAadapt}$, then the triggered VGA flag may be set to one per block 1212.

Exemplary Implementation of CTLE Adaptation Loop

This section describes an exemplary implementation of a CTLE adaptation loop in accordance with an embodiment of the invention.

Figure 13:
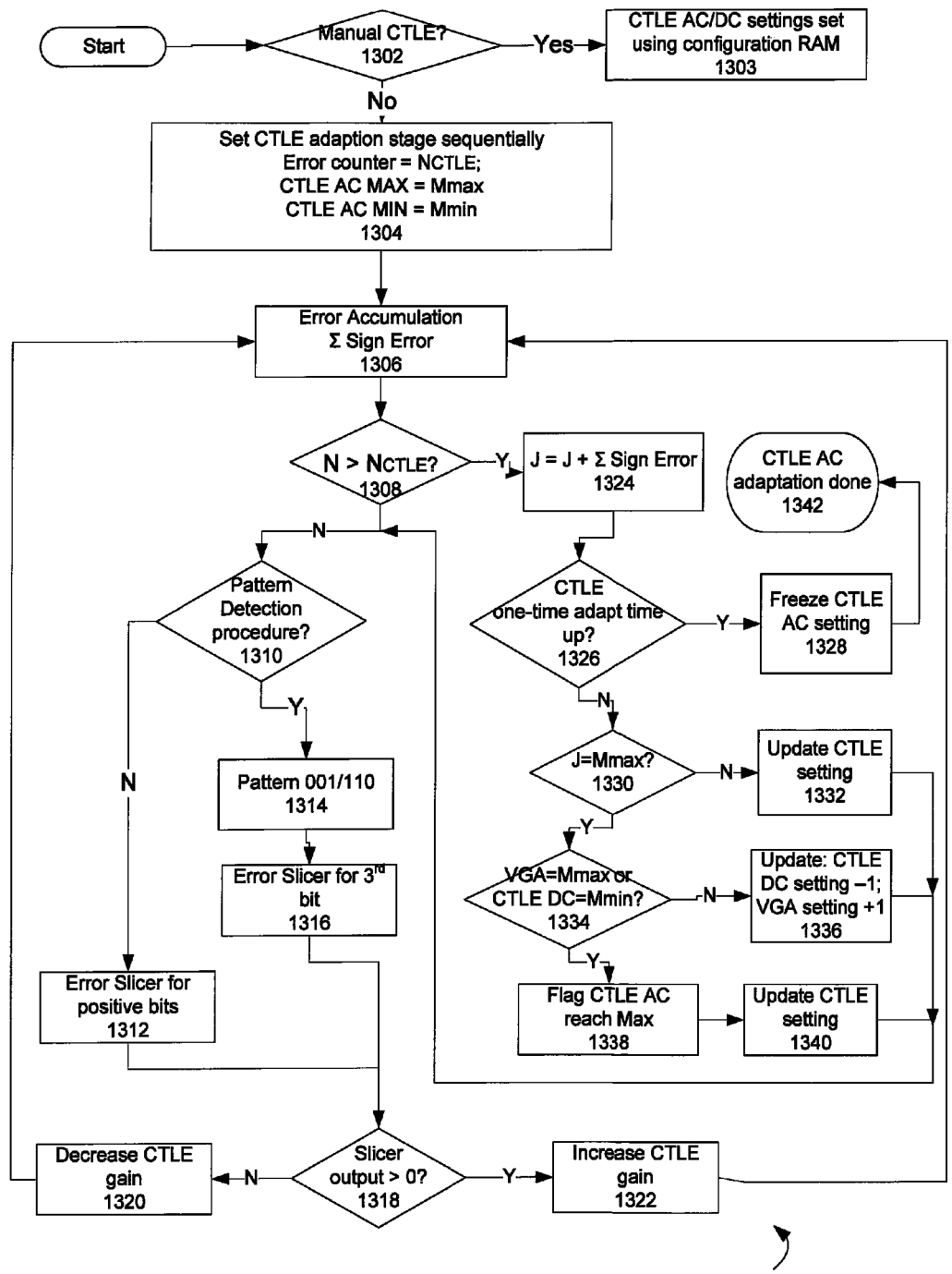
FIG. 13 is a flow chart of an exemplary implementation of a method for CTLE AC adaptation using a zero-forcing least-mean-square (ZF LMS) procedure in accordance with an embodiment of the invention.

FIG. 13 is a flow chart of an exemplary implementation of a method 1300 for CTLE AC adaptation using a ZF LMS procedure in accordance with an embodiment of the invention. As discussed above, the problem being solved by this method 200 is a complex one because there are many thousands of possible frequency responses with different DC settings and different high-frequency peaking positions.

The method 1300 starts with a maximum signal-to-noise ratio (SNR) by regulating the first stage of CTLE DC settings followed by optimizing AC boost. The method 1300 includes a novel pattern-based zero-forcing least-mean-square (ZF LFS) procedure. In addition, a novel error filter technique is disclosed that modifies the ZF LFS procedure to reduce RX jitter. Both real-time adaptation and one-time adaptation for a given channel are available for a user to select.

Per step 1302, an initial determination may be made as to whether the CTLE settings are to be set manually. This determination may be done by checking a configuration bit, for example. If so, then CTLE AC and DC settings for the multiple stages may be set per step 1303 based on values in configuration RAM. Otherwise, the procedure 1300 may move forward to step 1304 and used the modified ZF LMS procedure to set the CTLE settings.

Per step 1304, the adaptation may be performed sequentially for each of the multiple CTLE stages. An error counter $N_{CTLE}$ may be initialized, and minimum and maximum values for the AC boost may be set to initial values: CTLE AC MAX=Mmax; and CTLE AC MIN=Mmin.

Per step 1306, error accumulation may be performed. The error accumulation may involve a summation of the signs of detected errors (Z Sign Error).

Per step 1308, after a predetermined period of accumulation, a determination may be made as to whether the CTLE update counter N is greater than the error counter $N_{CTLE}$. If the CTLE update counter N not greater than the error counter $N_{CTLE}$ in step 1308, then a determination may be made, per step 1310, as to whether a pattern detection procedure is to be applied (for frequency or AC boost adaptation) or not (for amplitude or DC adaptation). This determination may be made by checking control bits for selection of either pattern detection or amplitude detection.

If a pattern detection procedure is not to be applied per step 1310, then an amplitude-based procedure for amplitude adaptation may be applied. In this case, the error slicer may be applied for positive bits per step 1312.

Otherwise, if a pattern detection procedure is to be applied for frequency boost adaptation per step 1310, then predetermined data patterns may be generated and provided to the CTLE per step 1314. In an exemplary implementation, the predetermined data patterns may be the bit pattern 001 and its complementary pattern 110. Per step 1316, an error slicer may then be applied to the last bit of the data pattern. Where the pattern is 001/110, the error slicer is applied to the third bit.

Thereafter, a determination may be made, per step 1318, as to whether the error slicer output is positive. If the error slicer output is not positive, then the CTLE gain may be decreased per step 1320. Otherwise, if the error slicer output is positive, then the CTLE gain may be increased per step 1322. Thereafter, the method 1300 loops back to step 1306 where further error accumulation is performed.

Now referring back to step 1308, if the CTLE update counter N is larger than the error counter $N_{CTLE}$, then a CTLE AC setting counter J may be incremented by the accumulated error (ΣSign Error) per step 1324.

Thereafter, per step 1326, a determination may be made as to whether a CTLE one-time adaptation time up has occurred. The determination of whether or not the time up has occurred may be performed in accordance with the method 1500 of FIG. 15, which is described in further detail below. If the one-time adaptation time up has occurred per step 1326, then the CTLE AC setting for that stage may be frozen per step 1328, and the CTLE AC adaptation for that stage may be deemed to be done per step 1342.

Otherwise, if the one-time adaptation time up has not occurred per step 1326, then a further determination may be made, per step 1330, as to whether the CTLE step counter J is at Mmax. If J is not at Mmax, then the CTLE setting may be updated per step 1332, and the method 1300 goes to step 1310 and the subsequent steps described above.

Otherwise, if J is at Mmax per step 1330, then a further determination may be made, per step 1334, as to whether the VGA setting is at Mmax, or the CTLE DC setting is at Mmin. (Note that, in this exemplary procedure, the value for Mmax is the same in blocks 1330 and 1334.) If neither is true (i.e. VGA setting is not at Mmax and CTLE DC setting is not at Mmin), then the CTLE DC setting may be decremented, and the VGA setting may be incremented, per step 1336. Thereafter, the method 1300 goes to step 1310 and the subsequent steps described above.

Finally, if either the VGA setting is at Mmax, or the CTLE DC setting is at Mmin, per step 1334, then a flag may be set indicating that the CTLE AC boost has reached a maximal value per step 1338, and the CTLE setting may be updated per step 1340. Thereafter, the method 1300 goes to step 1310 and the subsequent steps described above.

Figure 14:
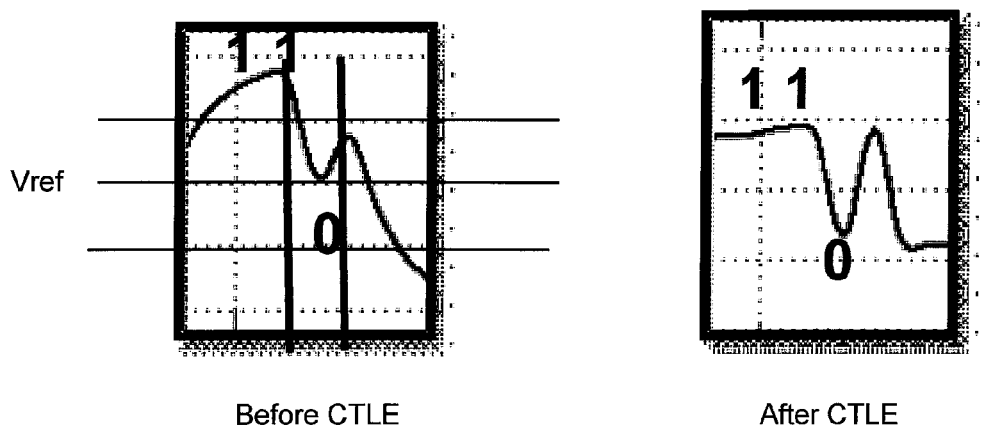
FIG. 14 is a diagram depicting a 110 pattern signal before and after CTLE in accordance with an embodiment of the invention.

FIG. 14 is a diagram depicting a 110 pattern signal before and after CTLE in accordance with an embodiment of the invention. The 110 pattern signal on the left is an example showing distortion in the signal levels before CTLE. After CTLE, the distortion may be largely removed, as shown on the right.

FIG. 15 is a flow chart of an exemplary implementation of a CTLE AC Time Up procedure 1500 which determines a CTLE Adapt done status in accordance with an embodiment of the invention. As shown, the procedure 1500 may begin by initializing variables to predetermined values per step 1502. In particular, the initialized variables may include: a time up counter $N_{CTLETU}$; an adaptation done counter $N_{CTLEdone}$, and a monotonic increment/decrement counter $N_{CTLEstep}$.

In step 1504, a CTLE step increment counter J may be used to accumulate a summation of the increment and decrement steps (J=Σ Inc/Dec Steps). Per step 1506, a determination may be made as to whether the CTLE step increment counter J is greater than the monotonic increment/decrement counter $N_{CTLEstep}$.

If J is greater than $N_{CTLEstep}$ per step 1506, then a counter reset flag may be set to one (Counter reset=1). Thereafter, the dynamic time up control counter M may be reset to zero (M=0) and then incremented (M=M+1) per step 1510. If J is not greater than $N_{CTLEstep}$ per step 1506, then the dynamic time up control counter M may be incremented (M=M+1) per step 1510.

Per step 1512, a determination may be made as to whether the dynamic time up control counter M is greater than the time up counter $N_{CTLETU}$. If M is not greater than $N_{CTLETU}$, then the procedure 1500 loops back to step 1504. On the other hand, if M is greater than $N_{CTLETU}$, then the procedure 1500 goes forward to step 1514.

In step 1514, an adapt done counter K is incremented (K=K+1). Thereafter, a determination may be made, per step 1516, as to whether K is greater than $N_{CTLEdone}$. If K is not greater than $N_{CTLEdone}$, then the procedure loops 1500 back to step 1504. Otherwise, if K is greater than NCTLEdone, then the procedure 1500 sets a flag that indicates the CTLE adapt done status per step 1518.

FIGS. 16A-16F depict exemplary CTLE AC DAC sequential charts in accordance with embodiments of the invention. In the exemplary implementation, the CTE has four stages, and six exemplary DAC sequential charts are shown.

Figure 16A:
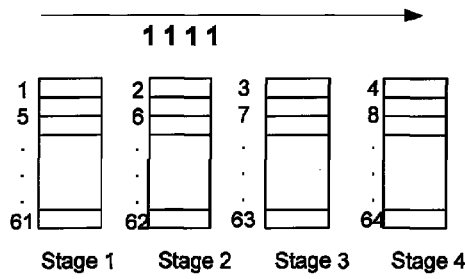
FIGS. 16A through 16F depict exemplary CTLE AC DAC sequential charts in accordance with embodiments of the invention.

A first sequential chart is shown in FIG. 16A. In this sequence, the first stage may be set to a first (lowest) setting, then the second stage may be set to the first (lowest) setting, then the third stage may be set to the first (lowest) setting, then the fourth stage may be set to the first (lowest) setting. These first four steps in the sequence are denoted 1, 2, 3 and 4 in the first row. For the fifth through eighth elements in the sequence, the first stage may be set to a second setting, then the second stage may be set to the second setting, then the third stage may be set to the second setting, then the fourth stage may be set to the second setting. These next four steps in the sequence are denoted 5, 6, 7, and 8 in the second row. And so on, until the $61^{st}$ through $64^{th}$ steps in the sequence, in which the first through fourth stages, respectively, may be set to the sixteenth setting.

Figure 16B:
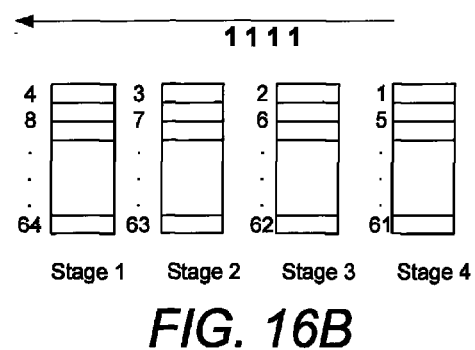

A second sequential chart is provided in FIG. 16B. In this sequence, the fourth stage may be set to a first (lowest) setting, then the third stage may be set to the first (lowest) setting, then the second stage may be set to the first (lowest) setting, then the first stage may be set to the first (lowest) setting. These first four steps in the sequence are denoted 1, 2, 3 and 4 from right to left in the first row. For the fifth through eighth steps in the sequence, the fourth stage may be set to a second setting, then the third stage may be set to the second setting, then the second stage may be set to the second setting, then the first stage may be set to the second setting. These next four steps in the sequence are denoted 5, 6, 7, and 8 from right to left in the second row. And so on, until the $61^{st}$ through $64^{th}$ steps in the sequence, in which the fourth through first stages, respectively, may be set to the sixteenth setting.

Figure 16C:
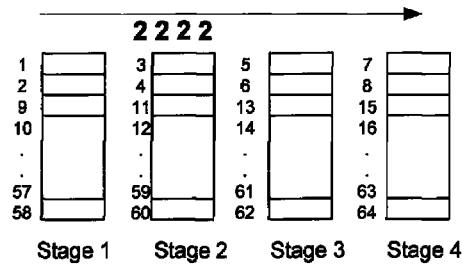

A third sequential chart is shown in FIG. 16C. In this sequence, the first stage may be set to a first (lowest) setting, then the first stage may be set to a second setting, then the second stage may be set to the first (lowest) setting, then the second stage may be set to a second setting, then the third stage may be set to the first (lowest) setting, then the third stage may be set to a second setting, then the fourth stage may be set to the first (lowest) setting, then the fourth stage may be set to the second setting. These first eight steps in the sequence are denoted 1, 2, 3, 4, 5, 6, 7 and 8 in the first two rows. Similarly for the next group of eight steps in the sequence, and so on.

Figure 16D:
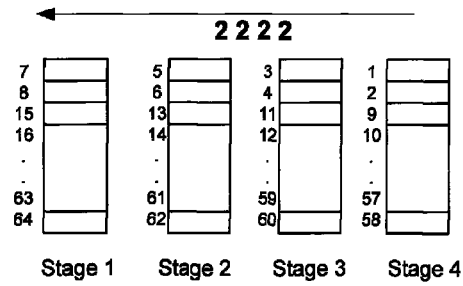

A fourth sequential chart is shown in FIG. 16D. In this sequence, the fourth stage may be set to a first (lowest) setting, then the fourth stage may be set to a second setting, then the third stage may be set to the first (lowest) setting, then the third stage may be set to a second setting, then the second stage may be set to the first (lowest) setting, then the second stage may be set to a second setting, then the first stage may be set to the first (lowest) setting, then the first stage may be set to the second setting. These first eight steps in the sequence are denoted 1, 2, 3, 4, 5, 6, 7 and 8 in the first two rows. Similarly for the next group of eight steps in the sequence, and so on.

Figure 16E:
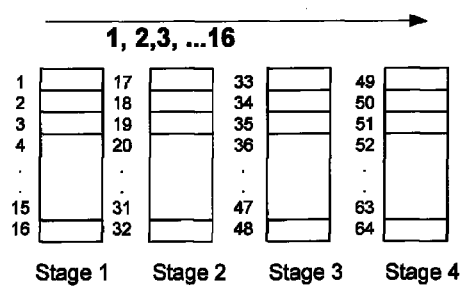

A fifth sequential chart is shown in FIG. 16E. In this sequence, the first stage may be set to a first (lowest) setting, then a second setting, then a third setting, and so on, until a sixteenth (highest) setting. These first sixteen steps in the sequence are denoted 1, 2, . . . , 16 in the first column. The next sixteen steps in the sequence pertain to the second stage and are denoted 17, 18, . . . , 32 in the second column. Similarly, the next group of sixteen steps pertain to the third stage and are denoted 33 through 48 in the third column. Finally, the last group of sixteen steps pertain to the fourth stage and are denoted 49 through 64 in the fourth column.

Figure 16F:
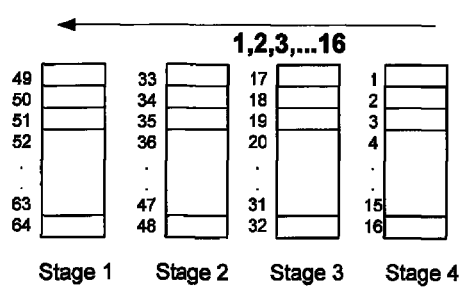

A sixth sequential chart is shown in FIG. 16F. In this sequence, the fourth stage may be set to a first (lowest) setting, then a second setting, then a third setting, and so on, until a sixteenth (highest) setting. These first sixteen steps in the sequence are denoted 1, 2, . . . , 16 in the fourth column. The next sixteen steps in the sequence pertain to the third stage and are denoted 17, 18, . . . , 32 in the third column. Similarly, the next group of sixteen steps pertain to the second stage and are denoted 33 through 48 in the second column. Finally, the last group of sixteen steps pertain to the first stage and are denoted 49 through 64 in the first column.

In an exemplary implementation, a threshold for error signal screening may be programmable. The screening threshold functions to reduce unnecessary weight bouncing so as to reduce quantization noise.

FIGS. 17A-17C depict results of error signal screening (filtering) with a first threshold in accordance with an embodiment of the invention. In this example, the screening threshold is set to five. FIG. 17A shows the error signal before screening. FIG. 17B shows the corresponding up-down error signal. Filtering is applied to this up-down error signal such that if the up-down error signal is less than the screening threshold, then no weight update is made. FIG. 17C shows the error signal after the screening (filtering).

FIGS. 17D-17F depict results of error signal screening (filtering) using a second threshold in accordance with an embodiment of the invention. In this example, the screening threshold is set to ten. FIG. 17D shows the error signal before screening. FIG. 17E shows the corresponding up-down error signal. Filtering is applied to this up-down error signal such that if the up-down error signal is less than the screening threshold, then no weight update is made. FIG. 17F shows the error signal after the screening (filtering). As seen, the higher threshold results in less frequent updates.

FIGS. 18A and 18B depict CTLE AC and DC adaptations, respectively, in accordance with an embodiment of the invention. An example of the adaptation of CTLE AC boosting over time is shown in FIG. 18A, and an example of the adaptation of a CTLE DC level, at high bandwidth, is shown in FIG. 18B.

Exemplary Implementation of DFE Adaptation Loop

This section describes an exemplary implementation of a DFE adaptation loop in accordance with an embodiment of the invention.

Figure 19:
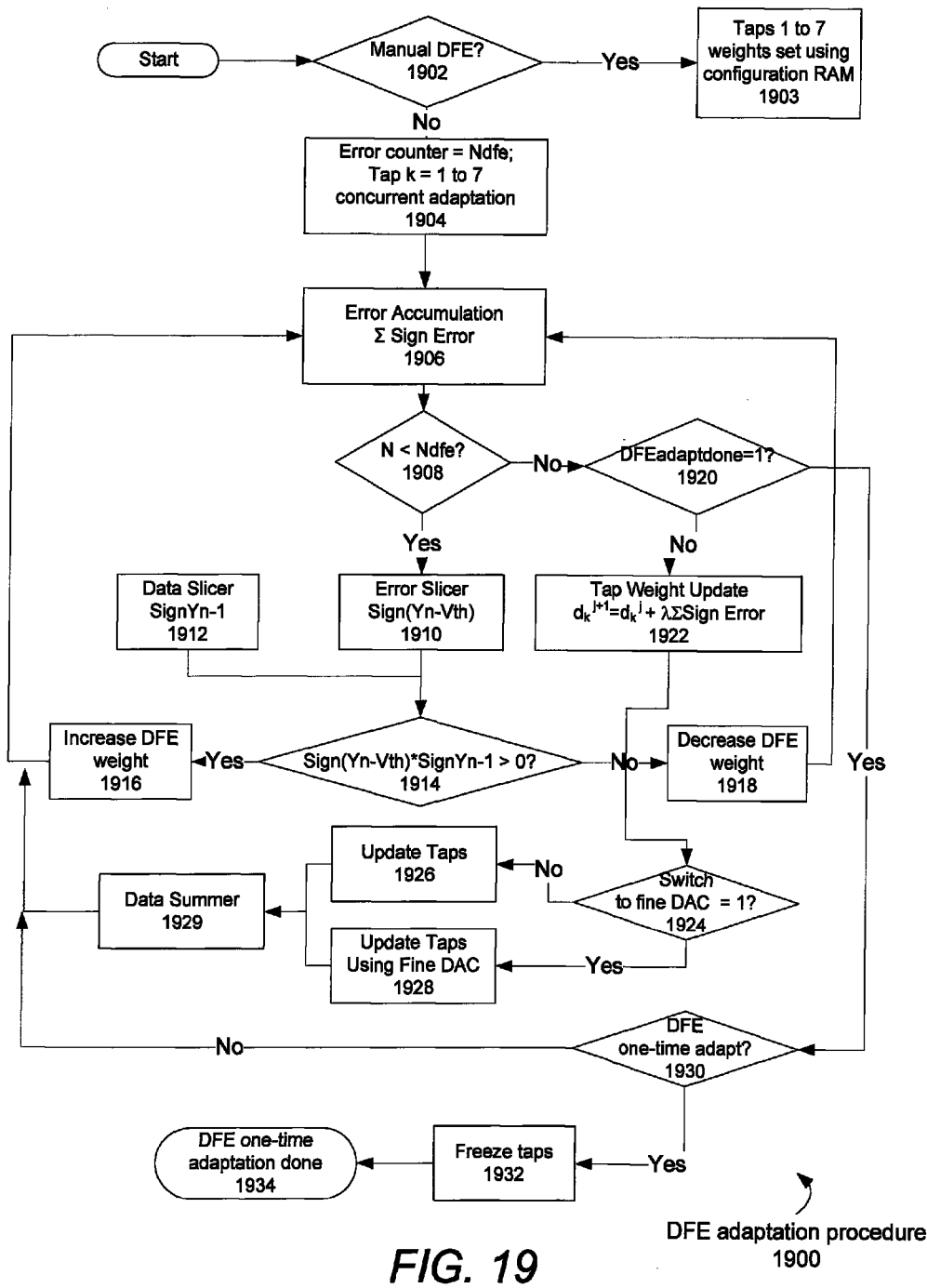
FIG. 19 is a flow chart of a method for DFE adaptation in accordance with an embodiment of the invention.

FIG. 19 is a flow chart of a method 1900 for DFE adaptation in accordance with an embodiment of the invention. The method 1900 includes a zero-forcing least-mean-square (ZF LFS) procedure that is modified to use coarse and fine resolutions to adapt DFE tap weights.

Per step 1902, an initial determination may be made as to whether the DFE taps are to be set manually. This determination may be done by checking a configuration bit, for example. If so, then a plurality of fixed taps (for example, taps 1 to 7) may be set per step 1903 based on values in configuration RAM. Otherwise, the procedure 1900 may move forward to step 1904 and used the modified ZF LMS procedure to set the tap values.

Per step 1904, an error counter Ndfe may be initialized. The adaptation may then be performed concurrently for multiple fixed taps in the feedback filter.

Per step 1906, error accumulation may be performed. The error accumulation may involve a summation of the signs of detected errors (Z Sign Error). Per step 1908, after a predetermined period of accumulation, a determination may be made as to whether the DFE update counter N is less than the error counter Ndfe.

If the DFE update counter N is less than the error counter Ndfe in step 1908, then an error slicer may be applied to the difference Yn-Vth per step 1910 to generate a sign signal Sign(Yn-Vth), where Yn is the data slicer output for the $n^{th}$ data, and Vth is the data amplitude reference or threshold voltage which is used to check the data amplitude. In addition, per step 1912, the SignYn−1 signal may be obtained, where Yn−1 is the data slicer output for the $(n-1)^{th}$ data. Per step 1914, these two sign values are multiplied, and a determination may be made as to whether the product is greater than zero. If Sign(Yn-Vth)*SignYn−1>0, then the DFE weight is increased per block 1916; otherwise, the DFE weight is decreased per block 1918. Thereafter, the method 1900 loops back to step 1906 where further error accumulation is performed.

On the other hand, if the DFE update counter N is larger than the error counter Ndfe in step 1908, then a check is made as to whether the DFEadaptdone flag is set per step 1920. If the DFEadaptdone flag is not set (i.e. if DFEadaptdone=0), then the DFE adaptation is not yet done, and the method 1900 performs a tap weight update procedure per step 1922. The tap weight update procedure may be performed according to the following equation: $d_k^{j+1}=d_k^j+\lambda \Sigma$Sign Error, where $d_k^{j+1}$ is the weight of the $k^{th}$ tap at time j+1, $d_k^j$ is the weight of the $k^{th}$ tap at time j, λ is the tap incremental step, and ΣSign Error is the accumulated sign error from step 1906. Thereafter, per step 1924, a determination may be made as to whether the Switch-to-fine-DAC flag has been set. If the Switch-to-fine-DAC flag is not set (i.e. if Switch-to-fine-DAC=0), then a coarse step mode is in effect so the taps are updated using the coarse DAC (digital-to-analog coverter) in step 1926. Otherwise, if the Switch-to-fine-DAC flag is set (Switch-to-fine-DAC=1), then a fine step mode is in effect so the taps are updated using the fine DAC in step 1928. After the taps are updated (in either step 1926 or step 1928), the method 1900 continues to the data summer in step 1929 and then loops back to step 1906 where further error accumulation is performed.

Referring back to step 1920, if the DFEadaptdone flag is set (i.e. if DFEadaptdone=1), then the DFE adaptation is done and the method 1900 moves forward and determines whether the DFE adaptation is a one-time adaptation in step 1930. If the just completed DFE adaptation is not a one-time adaptation, then the method 1900 loops back to step 1906 where further error accumulation is performed. Otherwise, if the just completed DFE adaptation is a one-time adaptation, then the weights of the taps may be frozen per step 1932, and the one-time adaptation may be deemed complete per step 1934.

Figure 20:
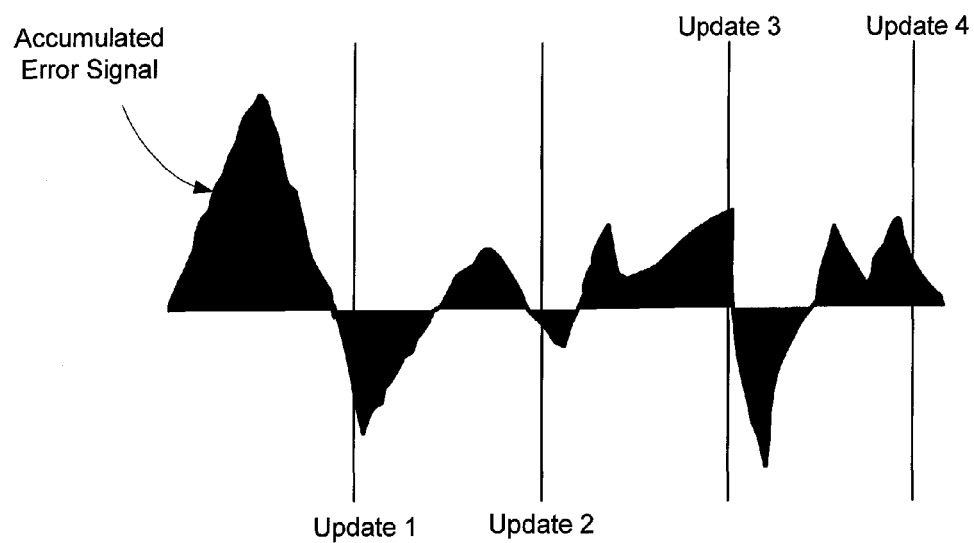
FIG. 20 is a diagram depicting tap weight updates in a fixed bandwidth mode in accordance with an embodiment of the invention.

FIG. 20 is a diagram depicting tap weight updates in a fixed bandwidth mode in accordance with an embodiment of the invention. In this fixed bandwidth mode of operation, the tap weights are updated after accumulation of a fixed number (for example, a number N) of error signals. In other words, the updates are performed at even intervals in the fixed bandwidth mode. The accumulated error signal may be a summation of sign errors.

As depicted, after a first interval of error accumulation, a first update (Update 1) is performed. Update 1 involves a decrease in tap weights because the accumulated error is negative at the end of the first interval. After a second interval of error accumulation, a second update (Update 2) is performed. Update 2 involves a decrease in tap weights because the accumulated error is negative at the end of the second interval. After a third interval of error accumulation, a third update (Update 3) is performed. Update 3 involves an increase in tap weights because the accumulated error is positive at the end of the third interval. Finally, after a fourth interval of error accumulation, a fourth update (Update 4) is performed. Update 4 involves an increase in tap weights because the accumulated error is positive at the end of the fourth interval.

Figure 21:
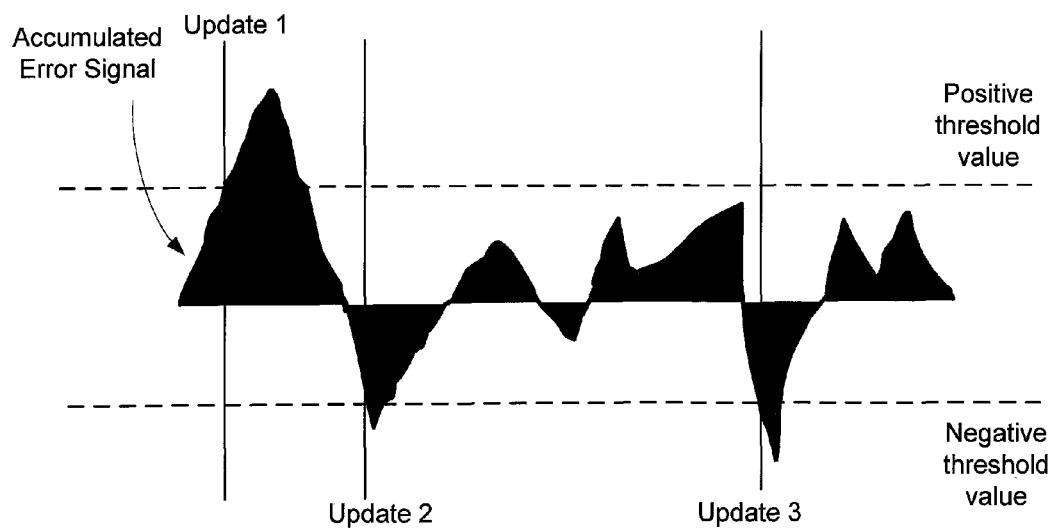
FIG. 21 is a diagram depicting tap weight updates in a variable bandwidth mode in accordance with an embodiment of the invention.

FIG. 21 is a diagram depicting tap weight updates in a variable bandwidth mode in accordance with an embodiment of the invention. In this variable bandwidth mode of operation, the tap weights are updated once a magnitude of the accumulated error signal increases from below a threshold value to above the threshold value. The accumulated error signal may be a summation of sign errors. In one implementation, two counters may be used to count the positive and negative error signals.

As depicted, after the accumulated error signal makes a first transition that is from below the positive threshold to above the positive threshold, a first update (Update 1) is performed. Update 1 involves an increase in tap weights because the accumulated error is positive at the threshold crossing. After the accumulated error signal makes a second transition that is from above the negative threshold to below the negative threshold, a second update (Update 2) is performed. Update 2 involves a decrease in tap weights because the accumulated error is negative at the threshold crossing. Finally, after the accumulated error signal makes a third transition that is from above the negative threshold to below the negative threshold, a third update (Update 3) is performed.

Advantageously, the variable bandwidth methodology described above may be used to reduce quantization noise. The reduction of quantization noise reduces jitter at the receiver.

Figure 22:
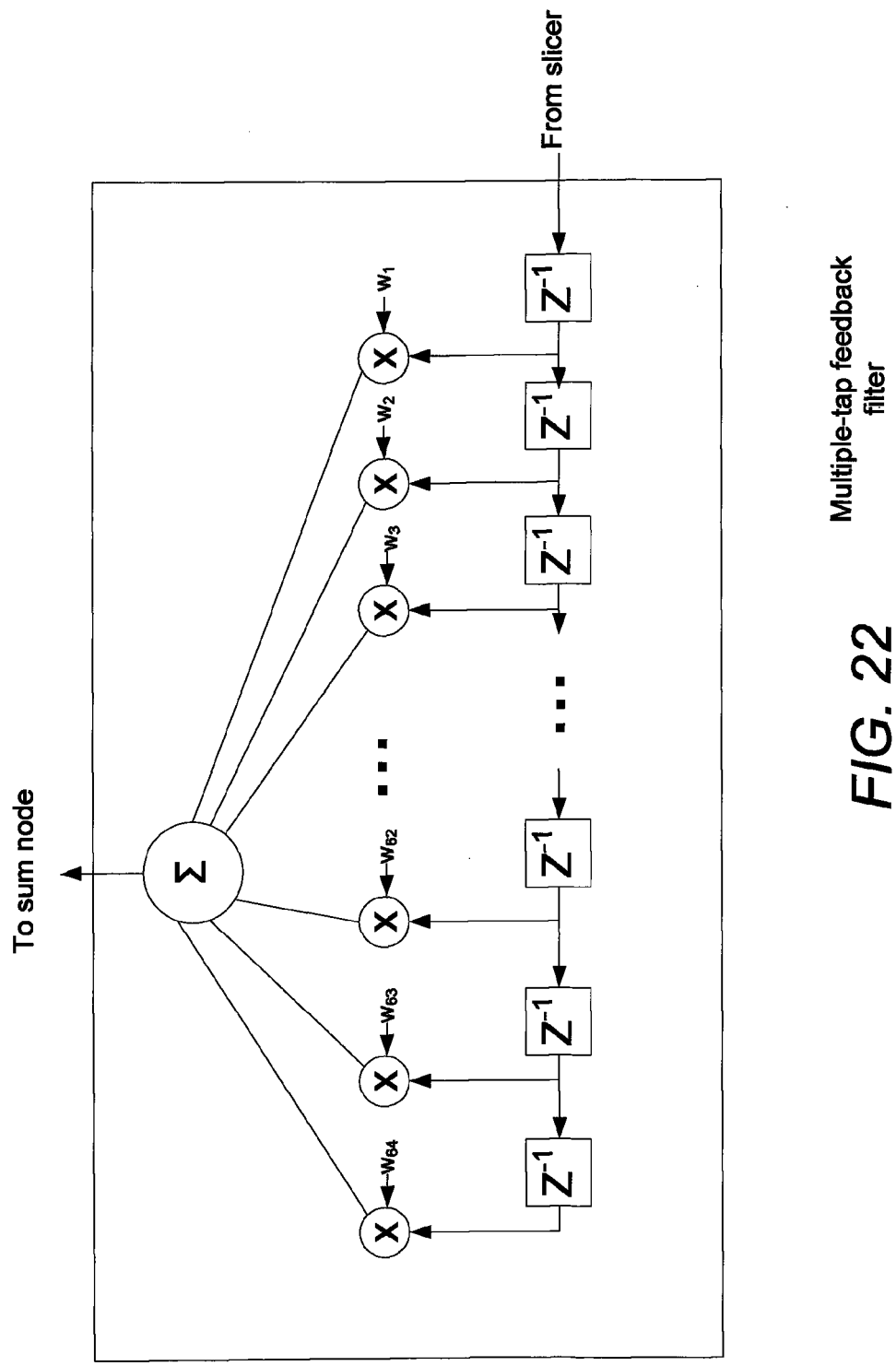
FIG. 22 is a diagram of a multiple-tap feedback filter in accordance with an embodiment of the invention.

FIG. 22 is a diagram of a multiple-tap feedback filter in accordance with an embodiment of the invention. As illustrated, the data signal fed back from the data slicer of the receiver may be input into a 64-stage tapped delay line of an exemplary filter structure. Each $Z^{-1}$ delay is a unit delay. In this example, there are 64 tap weights $w_1$ through $w_{64}$, and the combined signal from the $\Sigma$ node is output to the sum node where it is added to the signal that is input to the data slicer.

Figure 23:
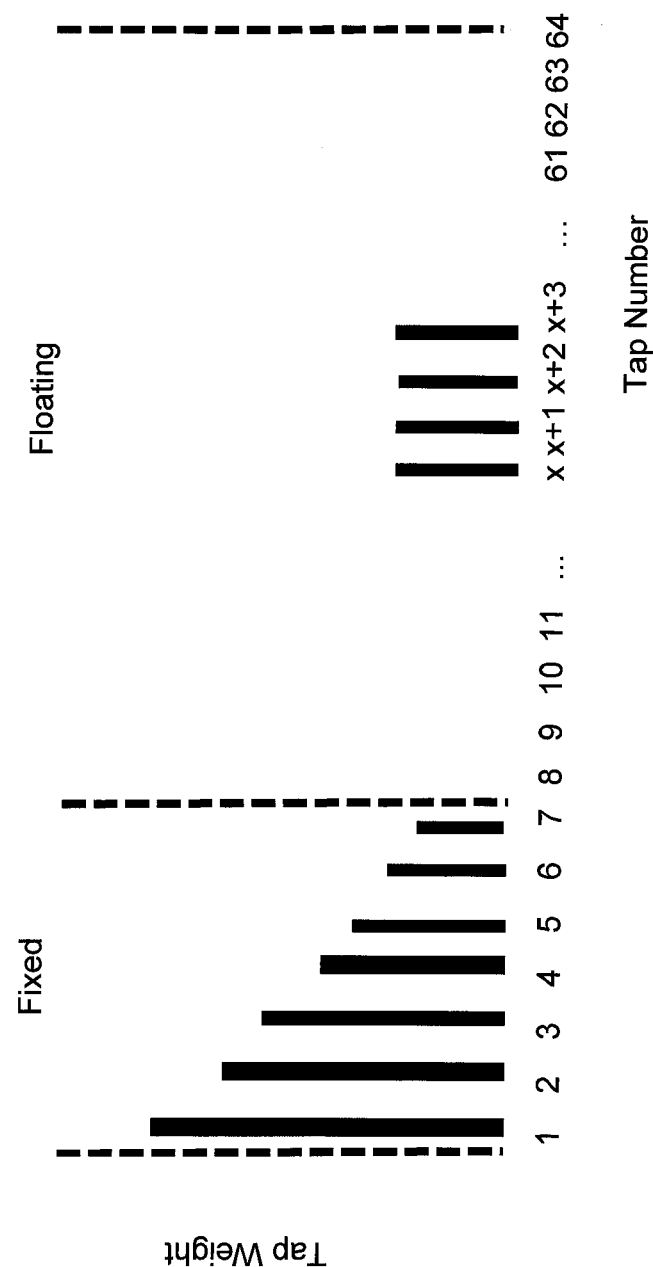
FIG. 23 is a diagram of fixed and floating taps for a feedback filter in accordance with an embodiment of the invention.

FIG. 23 is a diagram of fixed and floating taps for a feedback filter in accordance with an embodiment of the invention. In this exemplary implementation, the feedback filter includes 64 taps, where the first seven taps (tap number 1 through 7) are fixed, and there are four floating taps (tap numbers x, x−1, x+2 and x+3, where x may vary from 8 through 61).

The four floating taps may move together as their location is varied (i.e. as x is varied). The floating tap sweep may start with the floating taps at taps 8 through 11 (i.e. x=8) and be incremented one tap number at a time (i.e. x may be incremented by one each time) such that the sweep ends with the floating taps at taps 61 through 64.

A DFE tap weight convergence procedure may be applied and allowed to converge at each position (i.e. at each x) during the tap sweep. Once the floating taps are converged at that position, the following two values may be determined. A first value is the maximum tap weight among the four floating taps, and a second value is the sum of the four floating tap weights. The highest maximum tap weight of previous positions is stored in memory, along with the position corresponding to the highest maximum tap weight. Similarly, the sum of four floating tap weights of previous positions is stored in memory, along with the position corresponding to the highest maximum tap weight.

At each position (i.e. at each x) during the sweep of tap positions, the maximum tap weight of the current position may be compared with the memory-stored value of the highest maximum tap weight. If the maximum tap weight of the current position is greater, then it replaces the highest maximum tap weight, and the current position replaces the memory-stored values of the corresponding position. On the other hand, if the previously-stored highest maximum tap weight is greater, then no replacements are made. Thus, the highest maximum tap weight value and the corresponding position is tracked stored in memory during the sweep.

In addition, at each position (i.e. at each x) during the sweep of tap positions, the sum of floating tap weights of the current position may be compared with the memory-stored value of the highest sum of floating tap weights. If the sum of floating tap weights of the current position is greater, then it replaces the highest sum of floating tap weights, and the current position replaces the memory-stored values of the corresponding position. On the other hand, if the previously-stored highest sum of floating tap weights is greater, then no replacements are made. Thus, the highest sum of floating tap weights and the corresponding position is tracked and stored in memory during the sweep.

In accordance with an embodiment of the invention, the receiver may be configured to use one of multiple criteria for selecting a final position for the floating taps. For example, as described above, one criterion for the selecting the final position may be to select the position with the highest maximum tap weight, and another criterion may be to select the position with the highest sum of floating tap weights.

Figure 24A:
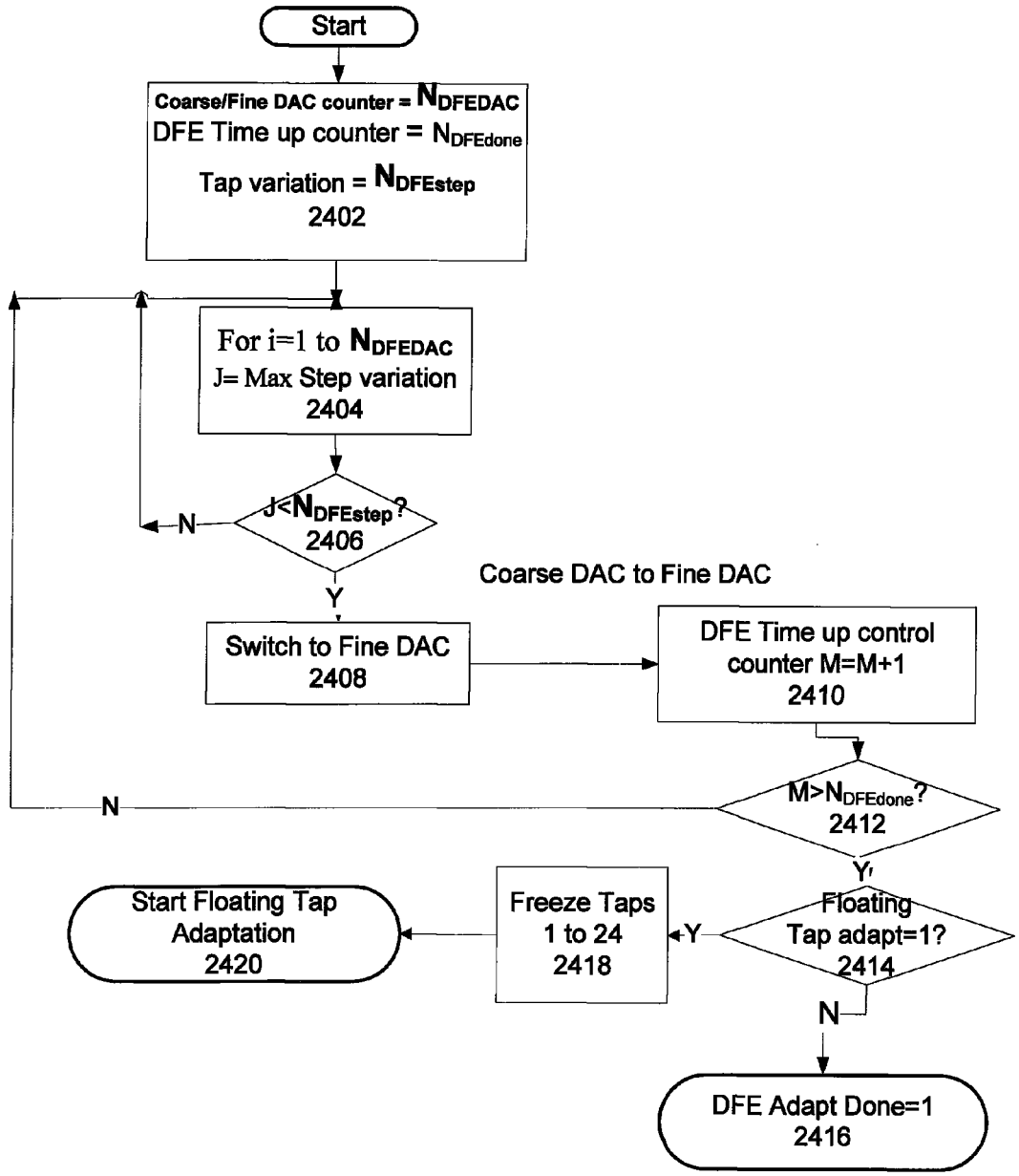
FIG. 24A is a flow chart of a procedure for detecting DFE adaptation convergence in accordance with an embodiment of the invention.

FIG. 24A is a flow chart of a procedure 2400 for detecting DFE adaptation convergence in accordance with an embodiment of the invention. Per step 2402, counters and variables may be initialized. These may include a coarse/fine DAC counter $N_{DFEDAC}$, a DFE time-up counter $N_{DFEdone}$, and a tap variation variable $N_{DFEstep}$.

Per step 2404, an instruction loop may be performed. In the instruction loop, a variable i may go from 1 to $N_{DFEDAC}$, and the variable J may be set to the maximum step variation.

Per step 2406, a determination may be made as to whether J is less than the tap variation variable $N_{DFEstep}$. If J is not less than $N_{DFEstep}$, then the procedure 2400 may loop back to step 2404. On the other hand, if J is less than $N_{DFEstep}$, then the procedure 2400 switches from use of a coarse DAC to use of a fine DAC per block 2408.

After switching to the fine DAC, then the DFE time-up control counter M may be incremented by one per block 2410. Thereafter, a determination may be made as to whether M is greater than $N_{DFEdone}$. If M is not greater than $N_{DFEdone}$, then the procedure 2400 may continue by looping back to step 2404. On the other hand, if M is greater than $N_{DFEdone}$, then a further determination may be made as to whether or not a floating tap adaptation (Floating Tap adapt) flag is set per step 2414.

If the floating tap adaptation flag is not set, then the DFE Adapt Done flag may be set to one per step 2416. If the floating tap adaptation flag is set, then the fixed taps (for example, taps 1 through 7, in one implementation) may be frozen at their current values per step 2418, and the floating tap adaptation may be started per step 2420.

Figure 24B:
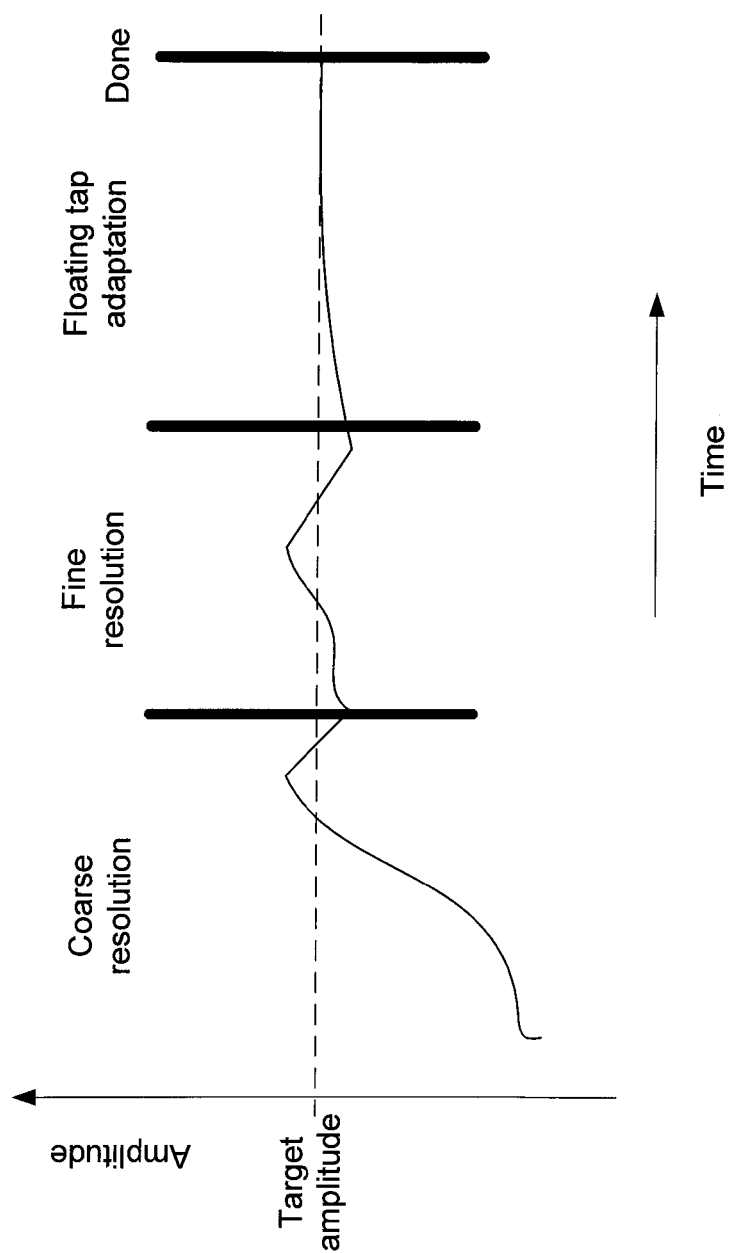
FIG. 24B is a graph illustrating amplitude convergence during coarse resolution and fine resolution modes in accordance with an embodiment of the invention.

FIG. 24B is a graph illustrating amplitude convergence during coarse resolution and fine resolution modes in accordance with an embodiment of the invention. As shown, the coarse-resolution adaptation mode for adapting the fixed taps switches to the fine-resolution adaptation mode. If the floating tap adaptation flag is set, then the floating tap adaptation mode may start once the fine-resolution adaptation is done.

Figure 25B:
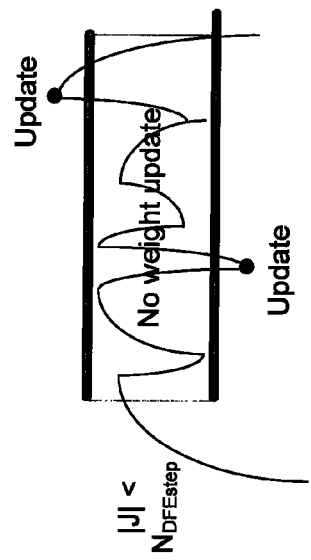
FIG. 25B is a diagram illustrating DFE weight updates not taking place when the error signal difference is below a threshold value in accordance with an embodiment of the invention.
Figure 25A:
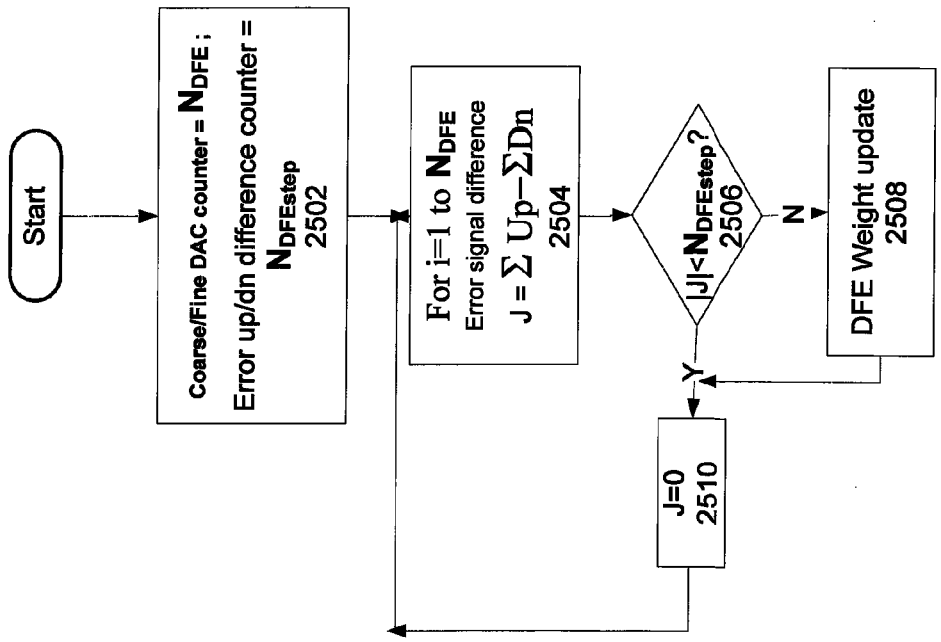
FIG. 25A is a flow chart of a method of variable-bandwidth DFE adaptation in accordance with an embodiment of the invention.

FIG. 25A is a flow chart of a method 2500 of variable-bandwidth DFE adaptation in accordance with an embodiment of the invention. Per step 2502, counters and variables may be initialized. These may include a coarse/fine DAC counter $N_{DFE}$ and an error up/down difference counter $N_{DFEstep}$.

Per step 2504, an instruction loop may be performed. In the instruction loop, a variable i may go from 1 to $N_{DFE}$, and the variable J may be used to track the error signal difference. The error signal difference may be the summation of up signals minus the summation of down signals.

Per step 2506, a determination may be made as to whether the magnitude of J is less than $N_{DFEstep}$. If the magnitude of J is less than $N_{DFEstep}$, then J may be reset to zero per step 2510, and the method 2500 may continue by going back to step 2504. Otherwise, if the magnitude of J is not less than (i.e. is greater than or equal to) $N_{DFEstep}$, then the DFE weight may be updated per step 2508. Thereafter, J may be reset to zero per step 2510, and the method 2500 may continue by going back to step 2504.

FIG. 25B is a diagram illustrating DFE weight updates not taking place when the error signal difference is below a threshold value in accordance with an embodiment of the invention. As shown, the updates occur only when the magnitude of J is greater than $N_{DFEstep}$.

Figure 26:
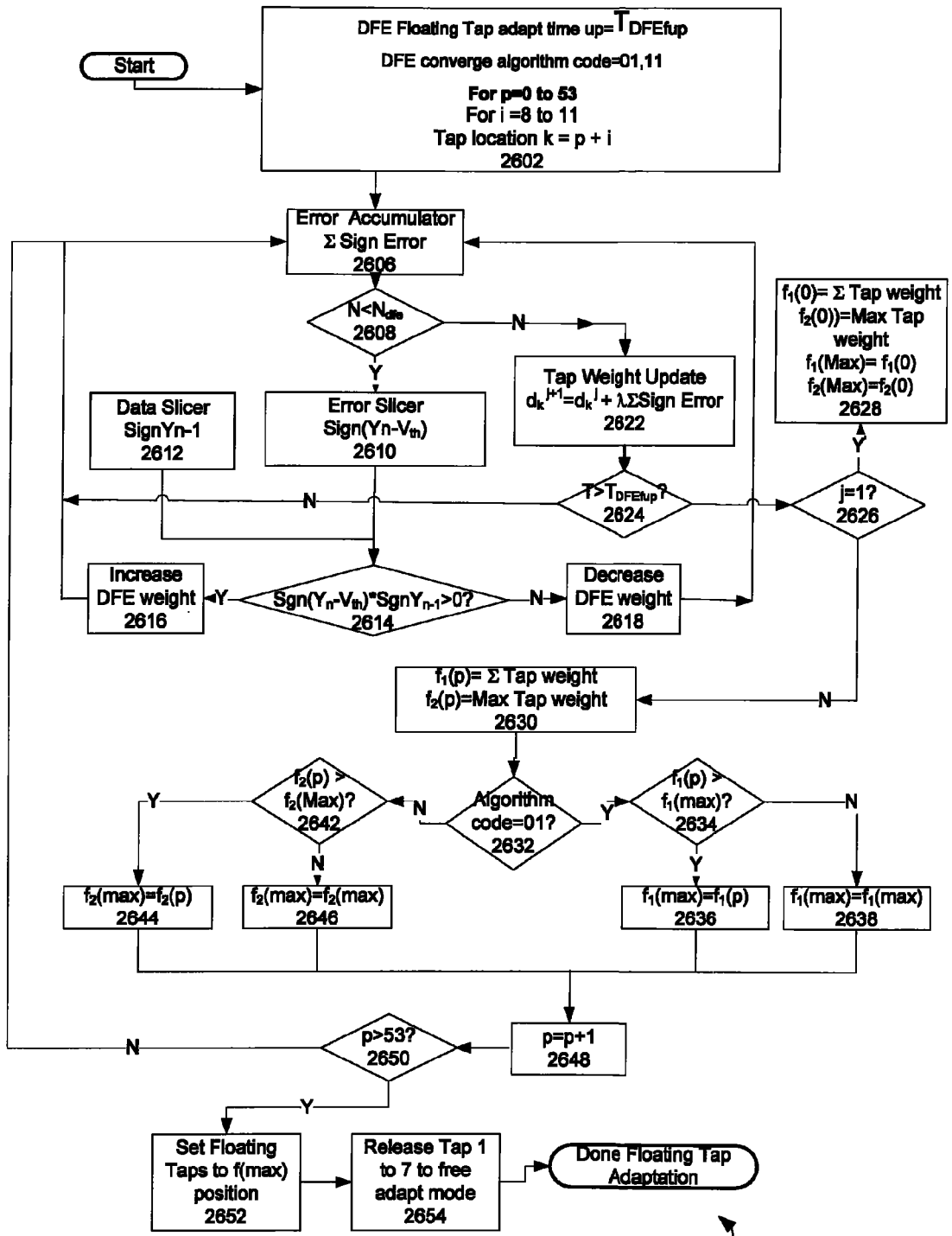
FIG. 26 is a flow chart of a method of DFE floating tap adaptation in accordance with an embodiment of the invention.

FIG. 26 is a flow chart of a method 2600 of DFE floating tap adaptation in accordance with an embodiment of the invention. The method 2600 includes a ZF LFS procedure and uses convergence detection which may be the same as or similar to that used for fixed tap adaption.

Per step 2602, variables may be initialized. A DFE floating tap adaptation time up may be set to $T_{DFEfup}$. In addition, a DFE converge algorithm code may be set to one of multiple values, each value corresponding to a different convergence criterion. In one implementation, the algorithm code may be one of two values: 01 or 11. An instruction loop may then be performed where the floating tap position variable p goes from 0 to 53, and where the floating tap offset variable i goes from 8 to 11. The individual floating tap location may then be given by k=p+i.

Per step 2606, error accumulation may be performed. The error accumulation may involve a summation of the signs of detected errors ($\Sigma$ Sign Error). Per step 2608, after a predetermined period of accumulation, a determination may be made as to whether the DFE update counter N is less than the error counter Ndfe.

If the DFE update counter N is less than the error counter Ndfe in step 2608, then an error slicer may be applied to the difference Yn−Vth per step 2610 to generate a sign signal Sign(Yn−Vth), where Yn is the data slicer output for the $n^{th}$ data, and Vth is the data amplitude reference or threshold voltage which is used to check the data amplitude. In addition, per step 2612, the SignYn−1 signal may be obtained from the data slicer, where Yn−1 is the data slicer output for the $(n-1)^{th}$ data. Per step 2614, these two sign values are multiplied, and a determination may be made as to whether the product is greater than zero. If Sign(Yn−Vth)*SignYn−1>0, then the DFE weight is increased per block 2616; otherwise, the DFE weight is decreased per block 2618. Thereafter, the method 2600 loops back to step 2606 where further error accumulation is performed.

On the other hand, if the DFE update counter N is larger than the error counter Ndfe in step 2608, then the tap weight may be updated per step 2622. In one implementation, the tap weight update may be in accordance with the equation $d_k^{j+1}=d_k^j+\lambda\Sigma\text{Sign Error}$, where $d_k^{j+1}$ is the weight of the $k^{th}$ tap at time j+1, $d_k^j$ is the weight of the $k^{th}$ tap at time j, $\lambda$ is the tap incremental step, and $\Sigma$Sign Error is the accumulated sign error from step 2606.

After the tap weight update per step 2622, a determination may be made per step 2624 as to whether the time-related variable T is greater than $T_{DFEfup}$. If so, then a further determination may be made as to whether p=0 (i.e. if this is the first location for the position variable p).

If p=0, then, per step 2628, the current sum of tap weights $f_1(0)$ is set to be the summation of the floating tap weights for p=0, and the current maximum tap weight $f_2(0)$ is set to be the maximum of the floating tap weights for p=0. In addition, the highest sum $f_1$(Max) is set to $f_1(0)$, and the highest maximum $f_2$(Max) is set to $f_2(0)$.

Otherwise, if p does not equal to zero (i.e. if this is not the first location for the position variable p), then, per step 2630, the current sum of tap weights $f_1(p)$ is set to be the summation of the floating tap weights for this value of p, and the current maximum tap weight $f_2(p)$ is set to be the maximum of the floating tap weights for this value of p. Thereafter, a determination may be made per step 2632 as to the DFE converge algorithm code. In one implementation, if the algorithm code is set to a first value (for example, code 01), then a first convergence criterion may be utilized, and if the algorithm code is set to a second value (for example, code 11), then a second convergence criterion may be utilized.

In an exemplary implementation, the first convergence criterion may depend on the highest sum of the floating tap weights. In this case, the method 2600 keeps track of the highest sum of the floating tap weights. Hence, per step 2634, a determination may be made as to whether the current sum of tap weights $f_1(p)$ is greater than the most recently stored value of $f_1$(max). If $f_1(p)>f_1$(max), then $f_1$(max)=$f_1(p)$ (and the value of p corresponding to this highest sum is stored) per step 2636; otherwise, $f_1$(max) remains unchanged per step 2638. Thereafter, the method 2600 may continue onto perform step 2648.

The second convergence criterion may depend on the highest maximum floating tap weight. In this case, the method 2600 keeps track of the highest maximum floating tap weight. Hence, per step 2642, a determination may be made as to whether the current maximum tap weight $f_2(p)$ is greater than the most recently stored value of $f_2$(max). If $f_2(p)>f_2$(max), then $f_2$(max)=$f_2(p)$ (and the value of p corresponding to this highest maximum is stored) per step 2644; otherwise, $f_2$(max) remains unchanged per step 2646. Thereafter, the method 2600 may continue onto perform step 2648.

Per step 2648, the position variable p may be incremented by one. Thereafter, per step 2650, a determination may be made as to whether the position variable p has reached the top of its range. In one implementation, the top of the range is when p=53. If p is not above the top of its range, then the method 2600 may go back to step 2606 and perform error accumulation for this next grouping of floating taps.

Otherwise, if p is above the top of its range, then the method 2600 may set the floating taps to the position corresponding to f(max) per step 2652. In other words, if the first convergence criterion is used, then the floating taps are set to the position indicated by the stored p value corresponding to $f_1$(max), and if the second convergence criterion is used, then the floating taps are set to the position indicated by the stored p value corresponding to $f_2$(max).

Thereafter, per step 2654, the fixed taps (for example, taps 1 to 7) that were previously frozen may be released such that they may be freely adapted. The floating tap adaptation method 2600 is then done.

Exemplary FPGA and System

Figure 27:
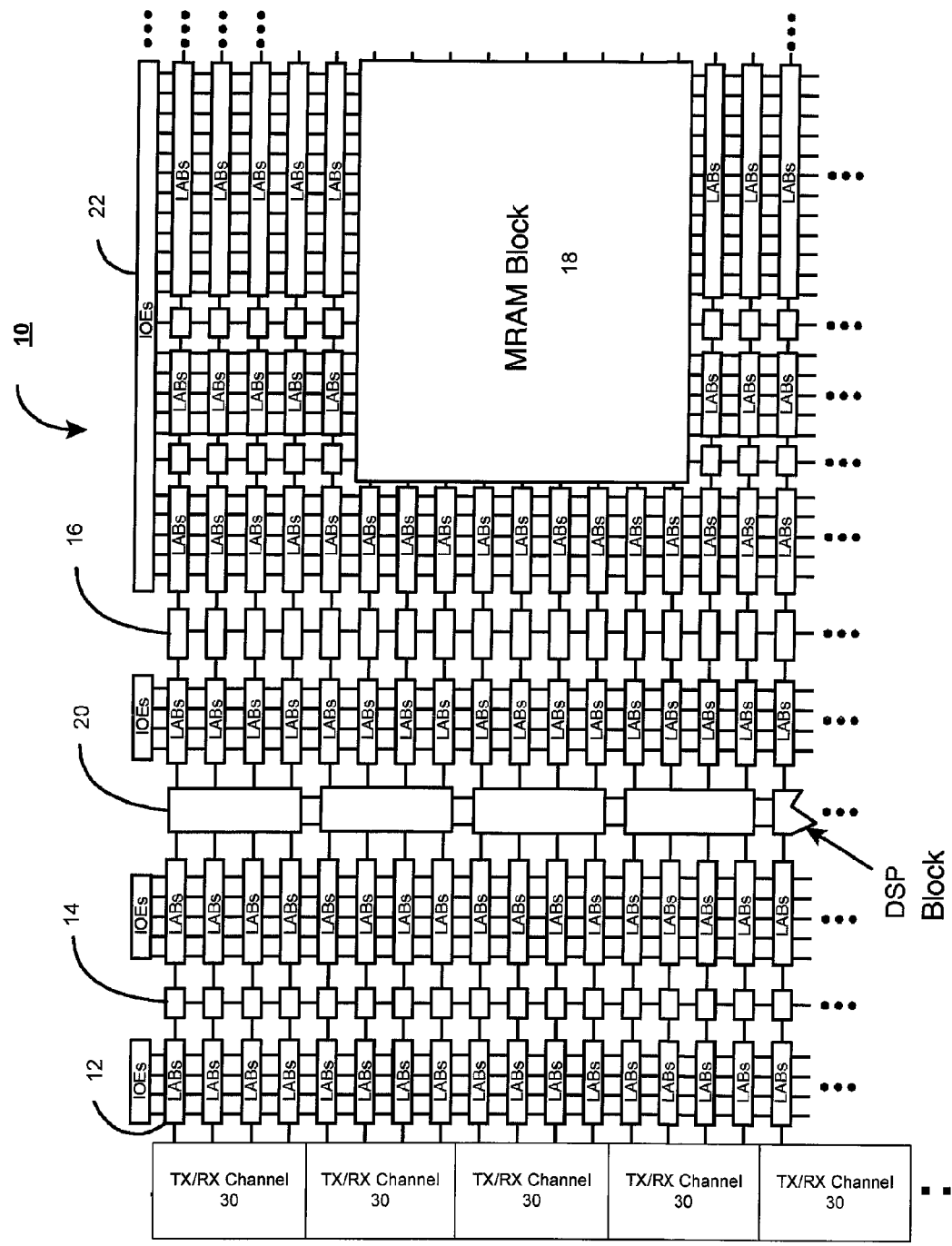
FIG. 27 is a simplified partial block diagram of a field programmable gate array (FPGA) that can include aspects of the present invention.

FIG. 27 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the receiver circuitry described herein.

It is to be understood that FPGA 10 is described herein for illustrative purposes only and that the present invention can be implemented in many different types of PLDs, FPGAs, and ASICs.

Figure 28:
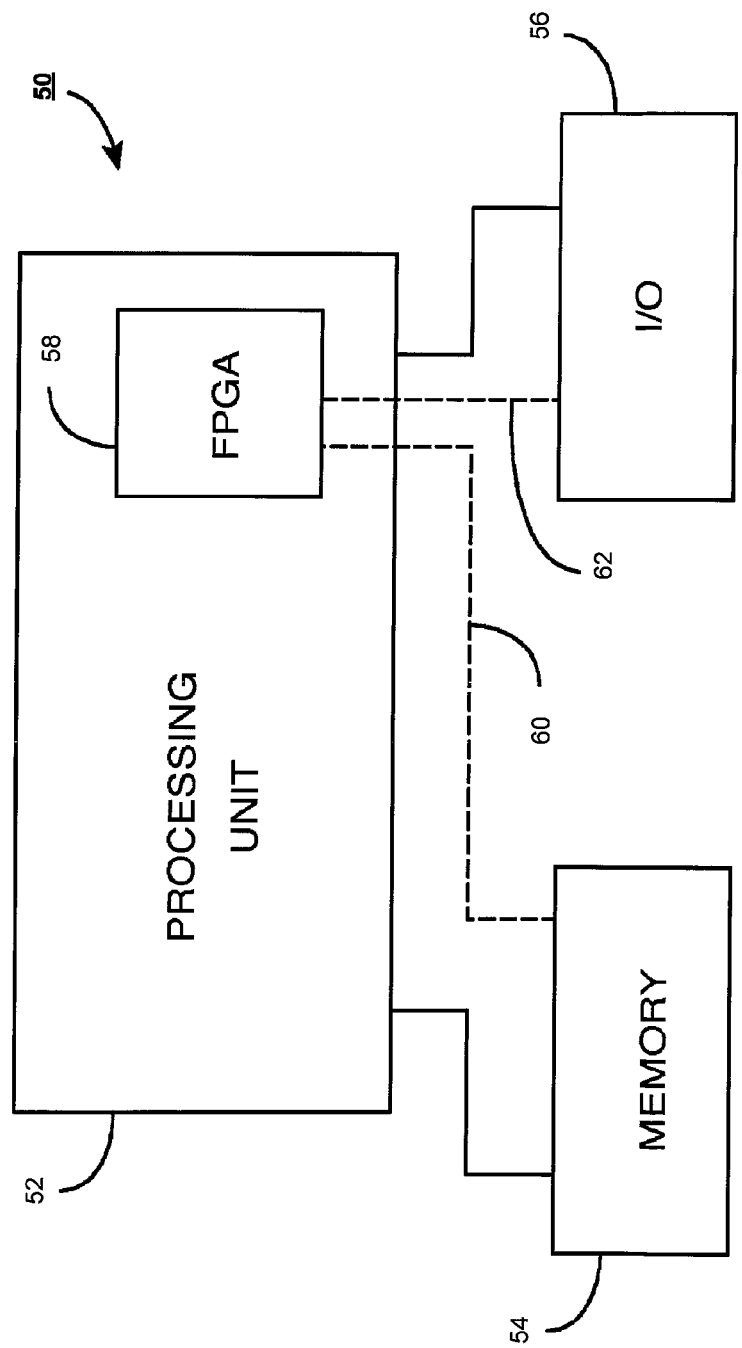
FIG. 28 shows a block diagram of an exemplary digital system 50 that includes an FPGA as one of several components and that may employ techniques of the present invention.

FIG. 28 shows a block diagram of an exemplary digital system 50 that includes an FPGA as one of several components and that may employ techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of adapting a receiver for equalization of an input data signal, the method comprising:
   setting a threshold voltage to an initial threshold voltage;
   performing adaptation of a variable gain amplifier (VGA) by a VGA adaptation loop of a receiver equalization (RX EQ) adaptive engine using the initial threshold voltage so as to adjust a VGA gain setting to regulate a data amplitude feeding into a decision feedback equalization (DFE) circuit;
   performing adaptation of the DFE circuit using the initial threshold voltage by a DFE adaptation loop of the RX EQ adaptive engine; and when the adaptation of the VGA is done, then freezing the VGA gain setting and performing adaptation of the threshold voltage by a threshold adaptation loop of the RX EQ adaptive engine.

2. The method of claim 1 further comprising:
performing adaptation of a continuous-time linear equalization (CTLE) amplitude.

3. The method of claim 1 further comprising:
performing continuous-time linear equalization (CTLE) frequency adaptation using the initial threshold voltage by a CTLE adaptation loop of the RX EQ adaptive engine.

4. The method of claim 1 further comprising:
when the adaptation of the threshold voltage is done, then determining whether the threshold voltage is within an acceptable range defined by lower and upper limits; and
if the threshold voltage is outside the acceptable range, then triggering performance of the adaptation of the VGA.

5. The method of claim 4 further comprising:
if the threshold voltage is within the acceptable range, then comparing a time interval count since the VGA gain setting against a VGA adaptation trigger; and
if the time interval count is greater than the VGA adaptation trigger, then triggering performance of the adaptation of the VGA.

6. The method of claim 1, wherein a bandwidth of a clock data recovery circuit is higher than a bandwidth for adjusting the VGA gain setting, and the bandwidth for adjusting the VGA gain setting is higher than a bandwidth for adaptation of the DFE circuit.

7. The method of claim 3, wherein a bandwidth of a clock data recovery circuit is higher than a bandwidth for adjusting the VGA gain setting, wherein the bandwidth for adjusting the VGA gain setting is higher than a bandwidth for adaptation of the DFE circuit, and wherein the bandwidth for adaptation of the DFE circuit is higher than a bandwidth for CTLE frequency adaptation.

8. The method of claim 7, wherein the bandwidth for CTLE frequency adaptation is higher than a bandwidth for adaptation of the threshold voltage.

9. A system for receiver equalization adaptation, the system comprising:
a decision feedback equalization (DFE) adaptation circuit module that adapts a DFE circuit of a receiver;
a continuous time linear equalization (CTLE) adaptation circuit module that adapts a CTLE circuit of the receiver; and
a threshold adaptation circuit module that adapts a threshold voltage that is fed to the DFE adaptation circuit and the CTLE adaptation circuit;
a variable gain amplifier (VGA) adaptation circuit module that adapts a VGA circuit,
wherein the VGA adaptation circuit module adjusts a VGA gain setting using an initial threshold voltage and then freezes the VGA gain setting, and
wherein, when the VGA gain setting is frozen, a threshold voltage fed into the VGA adaptation circuit module and the CTLE adaptation circuit module is switched from the initial threshold voltage to an adaptive threshold voltage, and the threshold adaptation circuit module adapts the adaptive threshold voltage.

10. The system of claim 9, wherein when the threshold adaptation circuit module is done with an adaptation of the adaptive threshold voltage, then the threshold adaptation circuit module determines whether the threshold voltage is within an acceptable range defined by lower and upper limits.

11. The system of claim 10, wherein if the threshold voltage is outside the acceptable range, then the threshold adaptation circuit module triggers the VGA adaptation circuit module to adapt the VGA gain setting.

12. The system of claim 10, wherein if the threshold voltage is within the acceptable range, then the threshold adaptation circuit module compares a time interval count since the VGA gain setting was frozen against a VGA adaptation trigger, and if the time interval count is greater than the VGA adaptation trigger, then the threshold adaptation circuit module triggers the VGA adaptation circuit module to adapt the VGA gain setting.

13. The system of claim 9, wherein a bandwidth of a clock data recovery circuit of the receiver is higher than a bandwidth for adjusting the VGA gain setting, and wherein the bandwidth for adjusting the VGA gain setting is higher than a bandwidth for adaptation of the DFE circuit.

14. The system of claim 13, wherein the bandwidth for adaptation of the DFE circuit is higher than a bandwidth for CTLE frequency adaptation.

15. The system of claim 14, wherein the bandwidth for CTLE frequency adaptation is higher than a bandwidth for adaptation of the threshold voltage.

16. An integrated circuit comprising:
a receiver comprising a continuous time linear equalization (CTLE) circuit and a decision feedback equalization (DFE) circuit;
a DFE adaptation circuit module that adapts the DFE circuit;
a CTLE adaptation circuit module that adapts the CTLE circuit; and
a threshold adaptation circuit module that adapts a threshold voltage that is fed to the DFE adaptation circuit and the CTLE adaptation circuit;
a variable gain amplifier (VGA) circuit that receives an output of the CTLE circuit and provides an input to the DFE circuit; and
a VGA adaptation circuit module that adapts the VGA circuit by adjusting a VGA gain setting using an initial threshold voltage and then freezes the VGA gain setting,
wherein, when the VGA gain setting is frozen, a threshold voltage fed into the VGA adaptation circuit module and the CTLE adaptation circuit module is switched from the initial threshold voltage to an adaptive threshold voltage, and the threshold adaptation circuit module adapts the adaptive threshold voltage.

* * * * *